US012300952B2

(12) United States Patent
LaBarge et al.

(10) Patent No.: US 12,300,952 B2
(45) Date of Patent: *May 13, 2025

(54) SYSTEMS AND METHODS FOR ELECTRICAL EARTHING SYSTEMS

(71) Applicant: GLXT Holdings, LLC, Blue Ridge, GA (US)

(72) Inventors: Thomas Evan LaBarge, Blue Ridge, GA (US); Gordon J. Wysong, Gainesville, GA (US); John Louis Broccoli, Copperhill, TN (US); John H. Belk, Blue Ridge, GA (US)

(73) Assignee: GroundLinx, Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,635

(22) Filed: May 9, 2022

(65) Prior Publication Data
US 2022/0294132 A1 Sep. 15, 2022

Related U.S. Application Data

(63) Continuation of application No. 16/986,566, filed on Aug. 6, 2020, now Pat. No. 11,329,406.
(Continued)

(51) Int. Cl.
*H01R 4/66* (2006.01)
*H01R 4/62* (2006.01)
(Continued)

(52) U.S. Cl.
CPC ............... *H01R 4/66* (2013.01); *H01R 4/62* (2013.01); *H01R 43/00* (2013.01); *H02G 9/02* (2013.01)

(58) Field of Classification Search
CPC . H01R 4/66; H01R 4/62; H01R 43/00; H01R 13/652; H01R 13/648;
(Continued)

(56) References Cited

U.S. PATENT DOCUMENTS 3,582,531 A * 6/1971 Sheelor ............... H01R 4/66
174/6
3,930,111 A * 12/1975 Sheelor ............... H01R 4/66
439/108
(Continued)

FOREIGN PATENT DOCUMENTS

CN 203192947 9/2013
EP 1995407 11/2008
(Continued)

OTHER PUBLICATIONS

NVENT "The Pros and Cons of 4 Common Ground Rod Materials" publication online, retrieved from the internet: https://blog.nvent.com/erico-the-pros-and-cons-of-4-common-ground-rod-materials/; retrieved Oct. 8, 2020; 5 pages.
(Continued)

*Primary Examiner* — Angel R Estrada

(57) ABSTRACT

A system and method are disclosed for an electrical earthing or grounding system to protect electrical systems and structures. Such systems and structures are efficient at dissipating broadband energy. An earthing mix system in contact with a grounding electrode is separated into functional components; a conductive earthing mix which is in contact with an electrical conductor and an impedance transitioning earthing composition which is in contact with the conductivity earthing mix. The conductive earthing mix absorbs, radiates, conducts, and dissipates electrical energy. The impedance transitioning earthing mix acts as a lossy impedance matching media to reduce reflections and improve energy transfer. A conductive slurry mix fills in voids and aids in contact between the other elements. A grounding electrode system connects an electrically conductive electrode with an earthing mix system to achieve reduced impedance mismatch between the local soil and the grounding system itself while
(Continued)

expanding the bandwidth of the overall system's grounding capability beyond traditional solutions.

22 Claims, 18 Drawing Sheets

Related U.S. Application Data

(60) Provisional application No. 62/883,300, filed on Aug. 6, 2019.

(51) Int. Cl.
*H01R 43/00* (2006.01)
*H02G 9/02* (2006.01)

(58) Field of Classification Search
CPC .... H01R 13/6485; H01R 13/655; H02G 9/02; H02G 9/00; H02G 13/40; H02G 13/00; H02G 13/80; H02G 9/10
USPC .... 174/6, 7, 5 SG, 2, 3, 37, 135; 361/117, 1
See application file for complete search history.

(56) References Cited

U.S. PATENT DOCUMENTS

| | | | |
|---|---|---|---|
| 4,192,963 A | | 3/1980 | Koehmstedt |
| 4,495,990 A | * | 1/1985 | Titus .................. E21B 43/2401 |
| | | | 392/304 |
| 5,086,849 A | * | 2/1992 | Dahl ..................... E02D 7/04 |
| | | | 173/90 |
| 6,515,220 B1 | | 2/2003 | Carpenter, Jr. |
| 10,236,598 B2 | | 3/2019 | LaBarge et al. |
| 11,329,406 B2 | * | 5/2022 | LaBarge .............. H01R 43/00 |
| 2003/0210959 A1 | | 11/2003 | Hannay et al. |
| 2018/0254569 A1 | | 9/2018 | LaBarge et al. |

FOREIGN PATENT DOCUMENTS

| | | |
|---|---|---|
| KR | 100898010 | 5/2009 |
| WO | WO2008026766 | 5/2008 |

OTHER PUBLICATIONS

International Search Report and Written Opinion issued by the U.S. Patent & Trademark Office as International Searching Authority on Oct. 22, 2020 for corresponding International Patent Application No. PCT/US2020/045129; 11 pages.

Communication Pursuant to Rule 164(1) EPC released by the European Patent Office for corresponding European Patent Application No. 20850223.7 on Jul. 6, 2023; 20 pages.

Extended European Search Report released by the European Patent Office for corresponding European Patent Application No. 20850223.7 on Oct. 5, 2023; 21 pages.

Lanzoni, J.A., "Managing Grounding Systems", Technical Paper of ISA, Instrument Society of America, vol. 50, No. Part 01, Apr. 25, 1995; pp. 161-170.

\* cited by examiner

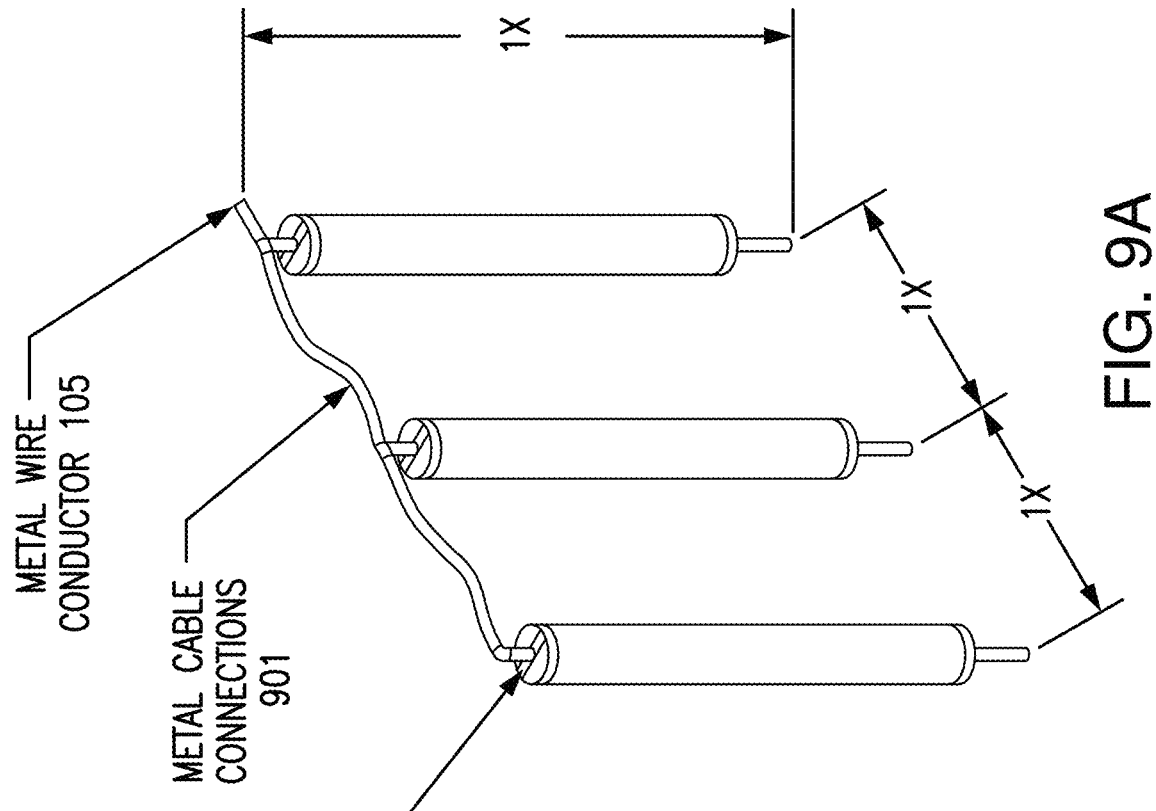
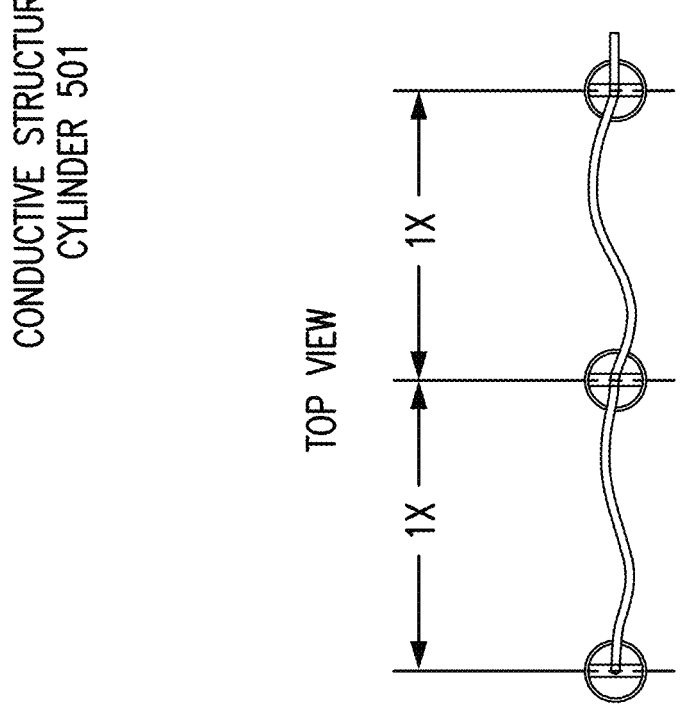

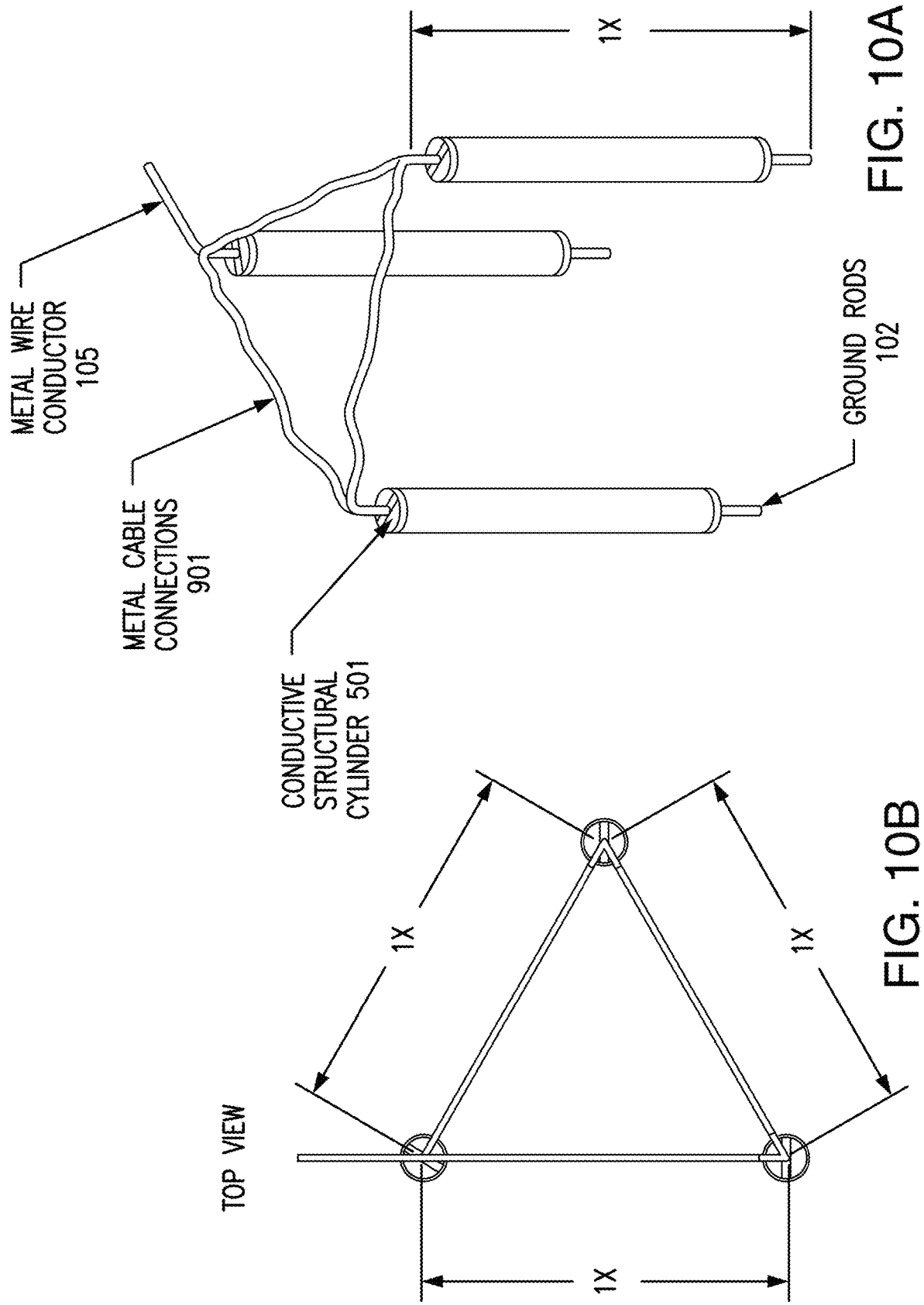

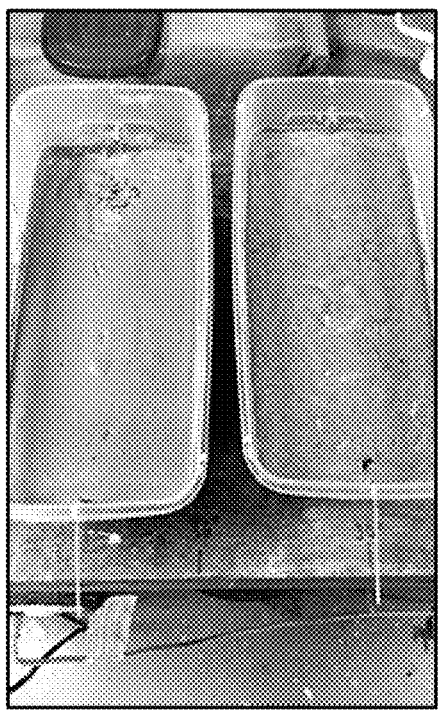
Day 1
Day 9
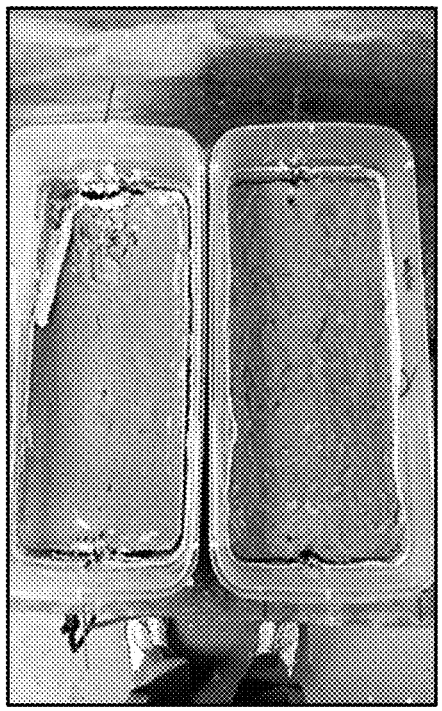
Day 14
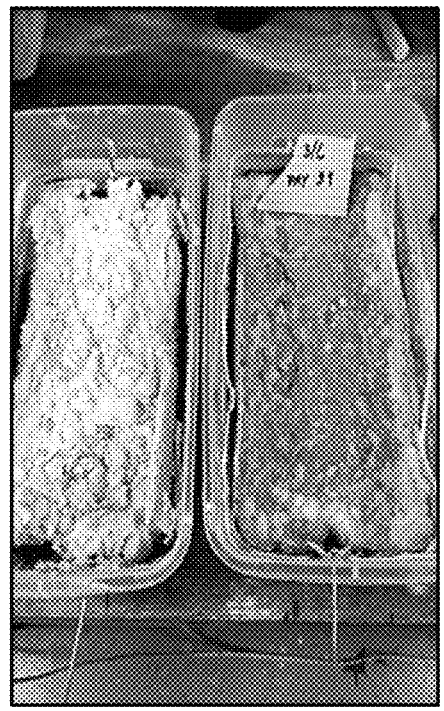
Day 39
FIG. 14

SYSTEMS AND METHODS FOR ELECTRICAL EARTHING SYSTEMS

CROSS-REFERENCE TO RELATED APPLICATIONS

This application claims priority to U.S. Non-Provisional application Ser. No. 16/986,566, filed on Aug. 6, 2020, now U.S. Pat. No. 11,329,406, and U.S. Provisional Application No. 62/883,300, filed on Aug. 6, 2019, which are relied upon and incorporated herein in their entirety by reference.

TECHNICAL FIELD

This disclosure relates to electrical grounding systems. More specifically, this disclosure relates to improvements in earthing mixes and related components and subcomponents for related systems employing ground electrodes.

BACKGROUND

Various electrical grounding techniques are utilized throughout the world for the prevention of electrical damage to buildings, equipment, and personnel. Such grounding techniques find numerous applications in such diversified areas as power and telecommunication systems, vehicles, electronic equipment, fuel storage tanks, industrial installations, commercial and residential buildings as well as buried equipment such as pipelines. A "ground" is an electrical connection between a circuit or equipment and the earth or a large conducting body that serves in place of the earth. "Grounding" or "earthing" an electrical system is installing a ground in the electrical system and is part of a normal electrical circuit. The safe return of errant electrical current (also called "fault current") to the earth without damage to life or devices is an important concern of businesses, utilities, and homeowners and to some degree can be handled by a normal grounding system. Fault currents can be created in myriad ways including by a lightning strike, equipment failures, a short in a circuit path from a tree branch, release of static charge build-up, or insulation failure and they can occur over any time scale including the first current to arrive called sub-transient current, transient current, and persistent current. When a grounding system fails to dissipate enough of a fault's energy, valuable assets can be destroyed and people can be injured or killed. In the United States, the National Electric Code (NEC) requires a protective ground to prevent voltage or charge build-up from a lightning strike, a short in a circuit path, or insulation failure that would otherwise cause electrical shock, injury, or death. In an industrial setting, the absence of a very low-resistance grounding path can cause a build-up of static electricity which in turn can introduce noise into communication and transmission circuits and can present a danger when handling flammable materials. Grounds protect electrical equipment or systems from reaching excessive voltage by providing an alternate path for current to travel (other than through an electrical circuit in the equipment). Grounding is also valuable for preventing electric shock hazards. A neutral wire connecting electrical equipment to a ground system of a structure prevents development of large voltage differences between the neutral line and a ground line leading from the ground pin of a plug to the chassis of the equipment.

The most basic grounding system would simply involve burying a grounding cable in the earth. This electrically conductive cable would then be responsible for dissipating and radiating electrical energy into the soil surrounding the cable. Various structures acting as core electrodes including for example cables, rods, and plates can be buried into the earth and electrically connected to a source of the current that is sought to be grounded (including fault current source) to provide a grounding or earthing electrode system and all come with compromises or disadvantages. Any of these designs can be used in a grid of grounding units.

A buried long bare electrical cable can provide the grounding connection to earth but this approach requires digging a long trench and the soil above the buried cable is very possibly not very thick though buried cables can prove useful in rocky terrain. Ground rods, also known as ground electrodes, are meant to balance the cost of installation (often simply hammered into the ground) while interacting with soil deep enough to provide a chance of surrounding the device with moisture. In terrain where the soil depth is much less than the ground rod length, horizontal grounding plates are sometimes used. Additional grounding electrode structures including concrete or cement filled with conductive powder or metal including rebar encased in a building foundation; both structure types can act as core electrodes for a grounding system.

FIG. 1 illustrates a simple ground rod design as known in the art. A simple example of the ground rod design could consist of a metal ground rod 102 placed in local or native soil 103 and attached to a fault current source 101. In this simple example, electrical charge would enter the ground rod 102 from a fault current source 101 via a conducting wire 105. The hope is that as much as possible of the arriving electrical charge would dissipate from the ground rod in all directions generally perpendicular to the surface of the ground rod 102 at that location. However, these basic measures can be insufficient to protect people or property during large current faults or faults including those consisting of frequencies outside the normal frequency range of the installation or as the local soil varies in electrical conductivity or moisture content. Some of the current in older systems can reflect the electrical energy back towards the source. As shown in FIG. 2, while some of the incoming current flow 110 will move along the ground rod 102 towards the ground rod tip 106, and then dissipate 120 into the local or native soil 103. However, a significant amount of the current becomes reflective current 130, traveling back up the ground rod 102 towards the fault current source 101 (not shown) via the metal wire conductor 105.

As society has increased its usage of various frequency bands, insufficient grounding system performance has become more concerning. Therefore, there is a need of a system that includes materials and structural element features which provide a more efficient and broadband energy path through and within a grounding system that is in electrical contact with local soil. In addition, there is a need for a more efficient transmission and delivery of fault current from current sources, including broadband sources, into local soil. Further, there is a need to provide more efficient transitions from a generally metal cable or structure into earthing mixtures and enhancements to soil and finally into the local soil along a fault current path.

SUMMARY

It is to be understood that this summary is not an extensive overview of the disclosure. This summary is exemplary and not restrictive and it is intended to neither identify key or critical elements of the disclosure nor delineate the scope thereof. The sole purpose of this summary is to explain and exemplify certain concepts of the disclosure as an introduction to the following complete and extensive detailed description.

In an aspect, the invention is directed at an earthing system that includes an electrode for placement in a hole in the ground of native soil, and earthing mixes that include a conductive earthing mix in contact with the electrode, and an impedance transitioning earthing mix between the electrode and the hole in the ground. In some aspects, the impedance transitioning earthing mix includes multiple impedance transitioning earthing mixes, each mix having a unique conductivity level. In these aspects, the multiple impedance transitioning earthing mixes are placed between the electrode and the native soil of the hole in the ground in descending conductivity level from the electrode to the native soil.

In an aspect, the electrode is comprised of more than one electrically conductive materials. The materials can be selected to cover different frequency bands. In some instances, the materials include copper and carbon fiber. The copper can handle low to high frequency bands, while the carbon fiber can handle very high frequency bands. In some instances, the electrode can include a third material, like alloys of iron or nickel, that can direct very low frequency bands.

In an aspect, the earthing mixes of the system can include a clay that has moisture retaining properties. Further, the earthing mixes can include conductive particles and/or non-conductive particles. In such aspects, the conductive particles can be elongated and/or non-elongated (e.g., roughly spherical). In other aspects, the non-conductive particles can be elongated and/or non-elongated (e.g., roughly spherical). In other aspects, in which both conductive particles and non-conductive particles are present in an earthing mix, the conductive particles are spherical when the non-conductive particles are elongated, and vice versa. In some aspects, elongated conductive particles are made from a magnetic material to oscillate and expend energy. In other aspects, elongated conductive and/or non-conductive particles function to retard moisture evaporation sufficiently by reducing cracking of the earthing mixture. As retention of moisture increases the electrical conductivity of an earthing mix as well as enables flow of ions, a minimum number and size of pathways for liquid or vapor water escape is desired; elongated particles reduce development of such pathways by serving as mechanical structural supports for the earthing mix. In an aspect, the earthing mixes can include a metal salt. In other aspects, the impedance transitioning earthing mix includes an organic base composition.

In an aspect, the electrode of the electrical earthing system can be connected to a current source, or it can be unconnected with a current source. In other aspects, the electrical earthing system can include a consolidation mix for replacing air spaces found between the conductive earthing mix, the impedance transitioning earthing mix, and the electrode. In such aspects, the consolidation mix can include a clay and/or conductive particles. In an aspect, the electrical earthing system can also include a top capping mix for placement over the electrode and the earthing mixes for placement over the hole to restrict evaporation within the earthing system. In such aspects, the mixes can include a diatomaceous clay. The diatomaceous clay can may up to and including 25% by weight in the impedance transitioning earthing mix or the top capping mix. In preferred aspects, the amount should be up to approximately 10% by weight of the mixes, with none in the conductive earthing mix.

In an aspect, the invention is directed at a method of installing an electrical earthing system that includes producing a hole in native soil of the ground, placing an electrode within the hole, placing a conductive earthing mix adjacent the electrode, and placing an impedance transitioning earthing mix between the conductive earthing mix and the native soil of the ground. In some aspects, the earthing mixes can include conductive and non-conductive particles. In some aspects, the method includes providing a plurality of impedance transitioning earthing mixes, where each one has a unique conductivity level, and then placing the impedance transitioning earthing mixes in order of descending electrical conductivity from the conductive earthing mix to the native soil of the ground. In another aspect, the method also includes placing a consolidation mix for replacing air spaces found in and between the earthing mixes and the electrode. In some aspects, the method can include placing a top capping mix over the hole, the electrode, and the other earthing mixes to restrict evaporation.

In one aspect, the invention is directed at an electrical earthing system that includes an electrode for placement in a hole in the ground and a conductive earthing mix that is in contract with the electrode while in the ground. In such aspects, the conductive earthing mix can include a clay having high moisture retaining properties, a plurality of conductive particles, a plurality of elongated particles, and a metal salt. In a portion of these instances, the elongated particles and the conductive particles can be one and the same. In some aspects, the electrode can include a number of conductive materials within different frequency bands, the combination of materials capable of handling low, medium, high, and very high frequency bands associated with broadband services. These materials can include, but are not limited to, copper, carbon fiber, nickel, and iron.

In some aspects, the electrical earthing system can include a number of impedance transitioning earthing mixes between the conductive earthing mix and the native soil of the ground. The impedance transitioning earthing mixes each include multiple electrically conductive particles, clays, and metal salts, and an organic base which gives each impedance transitioning earthing mix a unique conductivity level. The multiple impedance transitioning earthing mixes are then placed in descending order from the conductive earthing mix to the native soil based upon its electrical conductivity level, electrical resistance level, electrical reactance level, electrical capacitance level, or electrical impedance level.

In an aspect, the conductive earthing mixes of the electrical earthing systems include a clay having high moisture retaining properties, and make up approximately 50 to 99% of the mix by weight when the mix is dry. In an aspect, the minimum range of moisture retention of the mixture will be around 15% in a steady state, and 40% to 90% when initially installed. In some of these aspects, the clay may include Montmorilinite, Bentonite, Illite, Smectite and Attapulgite and blends thereof. In other aspects, the conductive earthing mix can include a kaolinite-based mineral that makes up 5 to 30% by weight of the mix.

In an aspect, the conductive earthing mixes of the electrical earthing system includes electrically conductive particles. The dispersion of the electrically conductive particles can be sufficient to enhance electrical percolation. In some instances of this aspect, the electrically conductive particles have a diameter that ranges between approximately one nanometer to approximately one millimeter. The dimensions of the electrically conductive particle dimension can be chosen based on expected wavelength of fault currents to preferentially absorb and emit specific frequencies based on the electrical properties of the earthing mix. In other aspects, the particles have an aspect ratio of less than three. In addition, the particles can make up between 0.05% to 8% of the conductive earthing mix by weight. In some aspects, the electrically conductive particles can include carbon, graphite, milled carbon fiber, soot, ash, metal-plated polymer pellets, metal-plated glass or ceramic pellets, metal powders including copper, iron, nickel and aluminum, and blends thereof.

In an aspect, the conductive earthing mixes of the electrical earthing system can include elongated electrically conductive particles, which can range in length between one nanometer to three centimeters. The length of the elongated particles may be chosen to absorb and emit near frequencies based on the electrical properties of the conductive earthing mix. In such aspects, the elongated electrically conductive particles can have an aspect ratio of at least three. In addition, the particles can make up between 0.05% to 8% of the conductive earthing mix by weight. In an aspect, the elongated electrically conductive particles can be composed of carbon fiber cuttings, nickel-plated polymer fibers, gold, copper-sulfate treated copper, boron fibers, conductive polymer fibers, carbon mesh, chopped metal wires, nickel nanostrands and other elongated electrically conductive particles, metal plated carbon fibers, carbon nanotubes, and semiconductors, and blends thereof. In aspects in which the elongated electrically conductive particles include semiconductors, the semiconductors can include carbon nanotubes, silicon rods, and germanium rods.

In an aspect, the conductive earthing mixes of the electrical earthing system can include a plurality of non-conductive particles, which can make up 0.1% to 10% by weight of the conductive earthing mix. In an aspect, the non-conductive earthing mixes include elongated non-conductive particles of at least one nanometer in length and/or having an aspect ratio of at least three. The elongated non-conductive particles are present when conductive particles are not elongated. In an aspect, the non-conductive particles include particles, filament, or fibers made of natural or synthetic non-conductive materials, including, but not limited to, polymers and other plastics, minerals, ceramics, and glass, and blends thereof.

In an aspect, the conductive earthing mixes of the electrical earthing system includes a metal salt. The metal salt can range between 1 to 50% of weight of the conductive earthing mix. In more preferable aspects, the metal salt can range between 10 to 50% by weight of the mix. In some instances, the metal salt can include, but is not limited to, magnesium sulfate, calcium sulfate, copper sulfate, cobalt carbonate, strontium carbonate, and calcium carbonate, either hydrated or anhydrous, and blends thereof. In some instances, the conducting earthing mix can include one or more barrier materials that assist in restricting moisture loss. Such barrier elements include, but are not limited to, Bentonite, nanoclays, talc, $MoS_2$, $WS_2$, and other planar materials. In such instances, the barrier elements can make up 0.01% to 2% by weight of the conductive earthing mix.

In an aspect, the impedance transitioning earthing mixes of the electrical earthing system includes an organic base, a plurality of electrically conductive particles, a plurality of clays, and a plurality of metal salts. which can range between 40% to 99% by weight of the transitioning earthing mix. The organic base can include peat, peanut hulls, rice hulls, cellulose or other fibrous organics, and blends thereof. In other aspects, the organic base includes materials more conductive than soil, which typically has an electrical resistivity greater than 7,500 Ohm-meters. In some instances, the electrically conductive particles have lengths ranging from one nanometer to three centimeters, and also have an aspect ratio of at least three. The electrically conductive particles can make up between 0.05% to 8% by weight of the impedance transitioning earthing mix. The electrically conductive particles may include carbon fiber cuttings, nickel-plated polymer fibers, gold, copper-sulfate treated copper, boron fibers, conductive polymer fibers, carbon mesh, chopped metal wires, nickel nanostrands, metal plated carbon fibers, carbon nanotubes, carbon, graphite, graphene, soot, metal-plated polymer pellets, metal-plated glass or ceramic pellets, metal powders including copper, iron, nickel and aluminum and semiconductors, and blends thereof. In some instances, the plurality of claims can make up 0.1% to 25% of the impedance transitioning earthing mix by weight, and can include, but is not limited to, gypsum, Montmorilinite, Bentonite, Illite, Smectite and Attapulgite and blends thereof. In some instances, the metal salt can make up 1 to 50% by weight of the impedance transitioning earthing mix, and can include, but is not limited to, magnesium sulfate, calcium sulfate, copper sulfate, cobalt carbonate strontium carbonate, and calcium carbonate, either hydrated and anhydrous, and blends thereof.

In an aspect, the impedance transitioning earthing mixes of the electrical earthing system includes a plurality of non-conductive particles. The non-conductive particle may have a length of at least one nanometer, as well as an aspect ratio of at least three. In some instances, the non-conductive particles can include particles, filaments, and/or fibers made from non-conductive materials including, but not limited to, polymers and other plastics, ceramic, and glass, and blends thereof. The non-conductive particles may make up 0.05% to 8% by weight of the impedance transitioning earthing mix.

In an aspect, the impedance transitioning earthing mix of the electrical earthing system can be formed, via extrusion with or without vacuum assist, into a structural shape for placement in the hole in the ground. In instances in which multiple impedance transitioning earthing mixes are needed, the highest impedance transitioning earthing mix (i.e., lowest conductivity level) can form an outside structure, with additional impedance transitioning earthing mixes configured to be placed inside, either in a structure or a mix form. In other aspects, the impedance transitioning earthing mix can be formed into pellets. The pellets can form an intermediate impedance transitioning earthing layer, and can be used with the structural shape impedance transitioning earthing mix. In either instance, electrically conductive particles can be included, and make up 2 to 8% by weight of the impedance transitioning earthing mix.

In an aspect, the electrical earthing systems include a consolidation mix for replacing air spaces found between the conductive earthing mix, the impedance transitioning earthing mix, and the electrode. The consolidation mix can include a clay, electrically conductive particles, and a metal salt. The consolidation mix can take the form of a slurry when added to the electrical earthing system. The clay can include, but is not limited to, Montmorilinite, Bentonite, Illite, Smectite and Attapulgite and blends thereof. The clay can make up 25 to 90% by weight of the consolidation mix. The electrically conductive particles can have an aspect ratio of at most three, and can make up 0.01% to 5% by weight of the consolidation mix. The electrically conductive particles can be made of conductive materials that include, but are not limited to, gold, nickel, copper (mixed with graphene or otherwise treated to restrict corrosion), milled carbon fibers, allotropes of carbon (including graphite, carbon black, carbon nanotubes, reduced graphene oxide, and graphene), allotropes of boron, and blends thereof. The metal salt can include, but is not limited to, magnesium sulfate, calcium sulfate, copper sulfate, cobalt carbonate, strontium carbonate, and calcium carbonate, either hydrated or anhydrous, and blends thereof. The metal salt can make up 1% to 30% by weight of the consolidation mix.

In some instances, the consolidation mix includes electromagnetic elongated conductive particles (EECPs). These EECP can have lengths ranging between one nanometer to three millimeters, and have an aspect ratio of at least three. The EECPS are configured to vibrate to dissipate energy. The EECPs can be made from materials that include, but are not limited to, carbon fiber cuttings, nickel-plated polymer fibers, gold, copper-sulfate treated copper, boron fibers, conductive polymer fibers, carbon mesh, chopped metal wires, nickel nanostrands, carbon nanotubes, and semiconductors, and blends thereof. When present, the EECPs may make up 0.01% to 5% by weight of the consolidation mix. In other aspects, the consolidation mix includes a defloculating agent, which can make up 0.01% to 3% by weight of the consolidation mix.

In an aspect, the electrical earthing system includes a top capping mix for covering the other components within the hole. The top capping mix can include a clay. The clay can include, but is not limited to, Montmorilinite, Bentonite, Illite, Smectite and Attapulgite and blends thereof, and be present in the top capping mix in a range from 50% to 75% by weight. The top capping mix can also include a calcium sulfate, either a hydrated or anhydrous form. The calcium sulfate can make up 30 to 50 by weight of the top capping mix. In some instances, the top capping mix can include a plurality of electrically conductive particles, which can make up 0.1% to 8% by weight of the top capping mix.

In an aspect, the electrode of the electrical earthing system can include electrically conductive components. The components can include, but is not limited to, cable, rod, plate, hollow cylinder, cement- or concrete-encased rebar foundation, carbon-based powder mixed with cement powder and allowed to cure over time, carbon-based powder mixed into a polymer and cured. The electrically conductive structure can include conductive components with end points or edges. In such aspects, the end points or the edges are held in a partially aqueous environment such that the endpoints or the edges become both RF and electrical current emitters or absorbers. In other aspects, the electrically conductive structure includes at least one layer each of porous or expanded metal and conductive fiber fabric, which can include carbon fiber fabric. In some aspects, the electrically conductive structure includes electrically conductive nanostructures, which can be made of carbon nanotubes and graphene. In some aspects, the electrically conductive structure can include sheets of vertically-aligned carbon nanotubes or platelets of graphene and carpet-like structures of carbon fiber or metal. In some aspects, the electrically conductive structure includes at least one layer each of metal and carbon nanostructures including nickel-plated carbon nanotube sheets. In some aspects, the electrically conductive structure can be in electrical communication with a fault current source via a bridge bar that provides direct communication from the fault source with all conductive elements in the electrically conductive structure.

In another aspect, the electrical earthing system can include an electrode having an electrically conductive hollow cylinder with an open-ended tube construction of a conductive metal and a carbon fiber fabric assembled onto at least a portion of the open tube, the carbon fiber fabric having a conductive relationship with at least a portion of the open tube.

In an aspect, an electrical earthing system can be installed in the following matter. An electronically conductive structure is placed within a hole in ground made of native soil, the electronically conductive structure having a hollow cylinder chamber. In an aspect, the hole may or may not have a grounding member. The hollow cylinder chamber may be defined between an inner wall and an exterior surface of the ground member. From here, an earthing mix is disposed within the hollow cylinder chamber, the earthing mix configured to conduct at least a portion of any fault current received by the ground member radially outwardly through the hollow cylinder chamber, through the inner wall of the electrically conductive hollow cylinder, and through the outer wall of the electrically conductive hollow cylinder. The earthing mix can include a conductive earthing mix. The method can also include circumferentially surrounding the electrically conductive hollow cylinder with an impedance transitioning earthing mix composition configured to circumferentially surround the electrically conductive hollow cylinder, providing an intermediate impedance having a value greater than the impedance of the electrically conductive hollow cylinder but less than an impedance of native soil of the hole.

In another aspect, the electrical earthing system can be installed in the following matter. The system, via a conductor from a fault source, is put in communication with an electrically conductive plate. A hole is fashioned in the earth, and a layer of impedance transitioning earthing mix is placed into the bottom of the hole. Next, a layer of electrically conductive earthing mix is placed on top of the impedance transitioning earthing composition layer. Then the electrically conductive plate is placed on top of the electrically conductive earthing mix layer. Another layer of the electrically conductive earthing mix is placed on top of the electrically conductive plate, and then another layer of impedance transitioning earthing composition is placed on top of the electrically conductive earthing mix layer. Then the hole is filled with either local soil or a backfill made from an earthing mix.

In another aspect, the electrical earthing system can be installed in a trench fashion. A fault source is present and in communication with an electrically conductive cable or wire. A trench is fashioned in the earth, a layer of impedance transitioning earthing mix is placed into the bottom of the trench. Next, a layer of electrically conductive earthing mix is placed on top of the impedance transitioning earthing mix. The electrically conductive cable or wire is then placed on top of the electrically conductive earthing mix layer. Another layer of the electrically conductive earthing mix is placed on top of the electrically conductive plate, and then a layer of impedance transitioning earthing composition is placed on top of the electrically conductive earthing mix layer. Then the trench is filled with either local soil or a backfill made from an earthing mix.

In an aspect, the electrode takes the form of electrically conductive cement or polymer, which can be installed in the following matter. A trench is fashioned in the earth, and a layer of impedance transitioning earthing composition placed into the bottom of the hole. Optionally, a layer of electrically conductive earthing mix may be placed on top of the impedance transitioning earthing composition layer. The electrically conductive cement or polymer is then poured on top of the electrically conductive earthing mix layer and allowed to solidify or cure. Then, the trench is filled with either local soil or a backfill made from an earthing mix.

In another aspect, the electrical earthing system can include a porous electrically conductive bag or basket that surrounds an electrode and the various earthing mixes discussed above. In an aspect, an electrically conducting core structure (cable, rod, plate, or hollow cylinder) is configured for communication with a fault current source, a first electrically conductive earthing mix in contact with the outer surface of some or all of the electrically conducting core structure, a second impedance transitioning earthing mix in contact with the outer surface of the first earthing mix, and a porous electrically conductive bag or basket surrounds all of the above save the electrical conductor in direct communication with the fault source where the outer surface of the second transitioning earthing mix is in contact with the local soil or in contact with other blended transitioning earthing mix(es) which are in contact with the native soil. The bag or basket provides a system that does not need to have a hole placed in the native soil. Instead, the electrode and earthing mixes can be placed on the native soil, with the impedance transitioning earthing mix added to surround the bag/basket. In such aspects, one or more impedance transitioning earthing mixes can be placed onto the native soil. Further, a consolidating mix may be utilized as well.

In an aspect, the electrical earthing system can include subsystems that can be wired in an electrically parallel array. Each subsystem includes an electrically conductive structure in communication with one another, with one potentially being in communication with a fault source, a conductive earthing mix, and an impedance transitioning earthing mix, with the conductive earthing mix placed in between the impedance transitioning earthing mix and an electrically conductive structure. The current passing through each electrically conductive structure in the array is transmitted, reflected, radiated, or absorbed commensurate with its frequency. In another aspect, the mixes include electrically conductive particles, which have been selected based upon the desired frequency for their electrode's frequency requirement for the array. In an aspect, the current passing through the buried electrode was reflected or otherwise redirected from a second electrical grounding system. The current reflecting from one electrode on its way back up the cable towards the fault source instead deviates into one of the other electrodes, where it will be exposed to that electrode's frequency behavior, further reducing the current that makes it back up the system into the current fault source. In some aspects, the electrically conductive structure can include sheets of vertically-aligned carbon nanotubes or platelets of graphene and carpet-like structures of carbon fiber or metal.

In another aspect, the electrical earthing system can include subsystems that can be aligned in series. In such aspects, each subsystem includes an electrically conductive structure, conductive and impedance transitioning earthing mixes surrounding the electrically conductive structure or in contact with native soil of a hole, and an electric communication means (e.g., a cable) that allows adjacent electrically conductive structures to communicate with one another. At least one of the electrically conductive structures is configured for communication with a fault current source. In an aspect, the first electrically conductive structure defines a buried attachment point from which a conductive cable extends to one or more additional electrical grounding systems, the additional conductive cable configured to expose current passing through the conductive cable from outside the first electrically conductive structure into the buried attachment point to the earthing mixes of the first electrically conductive structure as it travels back through the first electrically conductive structure. In an aspect, the current passing through the electrode is reflected or otherwise redirected from one or more subsequent electrical grounding systems in series progressively reducing the amplitude of the electrical energy being reflected.

In an aspect, the electrical earthing system can include a first high electrical loss electrical grounding subsystem and a second high electrical loss electrical grounding subsystem installed closer to the first high loss electrical grounding subsystem than the maximum physical dimension of either. The Sphere of Influence theory has resulted in the US National Electrical Code specifying a minimum spacing between two 6-foot-long grounding rods being 6 feet. However, a typical ground rod has a much lower electrical loss than electrical protection earthing system meaning of the present application. Use of high electrical loss electrical grounding systems allows for closer spacing with the same or better efficiency.

In an aspect, the electrical earthing system is configured to operate as a grounded electrical shielding system. In such aspects, a solid or porous sheet, cylinder, conduit, or structure of low frequency, high permeability material including iron or nickel is buried with the electrode and various earthing mixes, with this structure located in the earth or soil between an RF source and a cable or structure in need of shielding, with the electrical connection between the shield structure provided by contact with local soil or earth. In an aspect, electrically conducting metal or carbon sheet(s) can be placed adjacent to the low frequency high permeability material to add broadband protection with electrically conducting metal or carbon sheet(s) adjacent to the low frequency high permeability material. In an aspect, the electrode is not configured for direct communication via a wire or cable with a fault current source, but a first electrically conductive earthing mix in contact with the outer surface of some or all of the electrode where some or all of the electrode and some or all of the electrically conducting earthing mix are configured for direct communication with the local soil. In an aspect, a first electrically conductive earthing mix is in contact with the outer surface of some or all of the electrically conducting structure, a second impedance transitioning earthing mix in contact with some or all of the outer surface of the first earthing mix where some or all of the electrically conducting structure and some or all of the impedance transitioning earthing mix are configured for direct communication with the local soil.

The present disclosure relates to a system, apparatus, and method for an energy-dissipating electrical grounding system.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIGS. 9A-B illustrate the typical geometry of three grounding electrode units in parallel.

FIGS. 10A-B illustrate a geometric arrangement of multiple subsystems according to an aspect of the present invention.

FIG. 14 illustrates a series of progressive drying of two earthing mix samples over a period of days.

DETAILED DESCRIPTION

Figure 1:
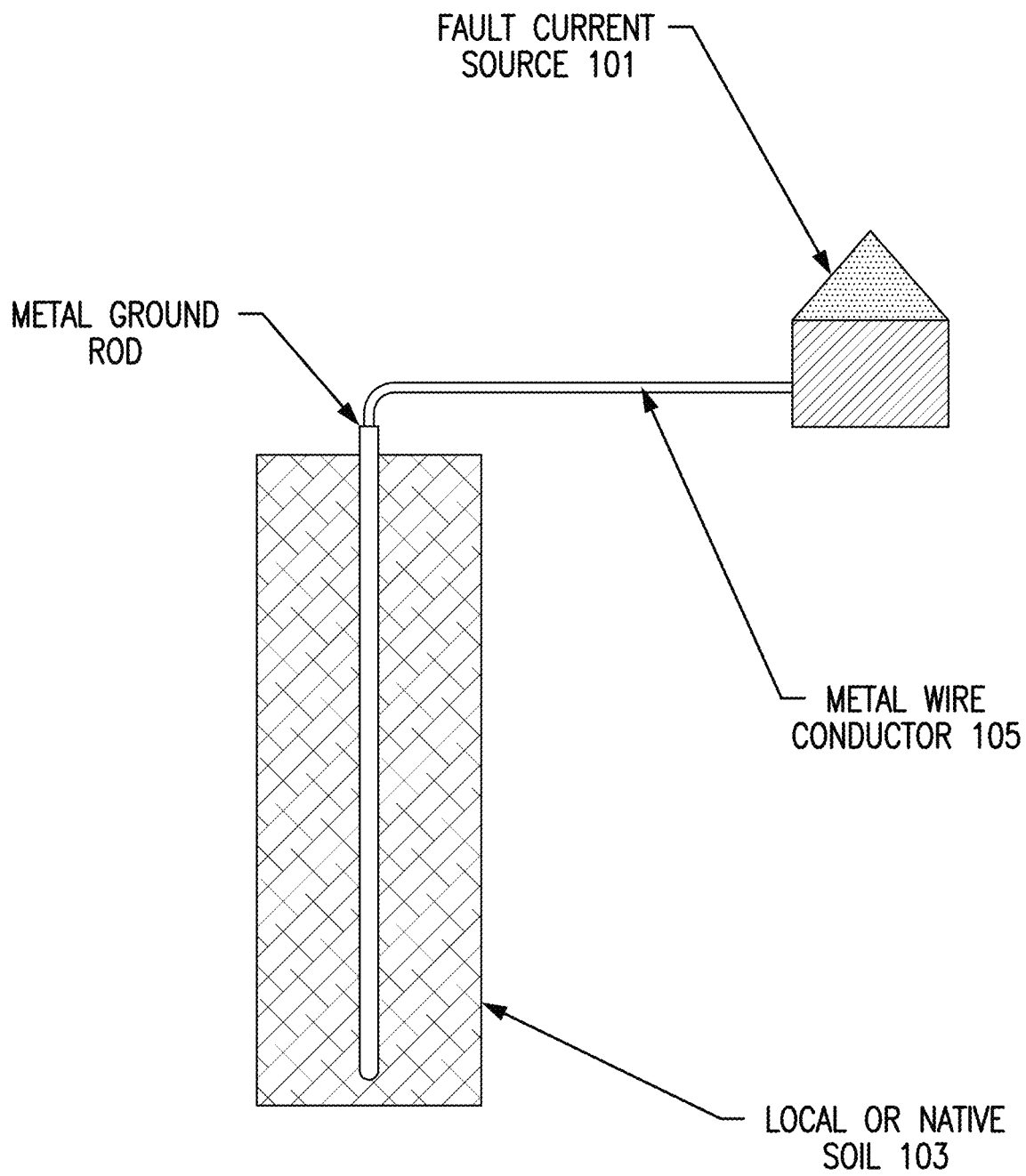
FIG. 1 illustrates a typical grounding system known in the art.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the present disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "top," "bottom," "side," "upper," "lower," "horizontal," and/or "vertical" may be referenced. Unless stated otherwise, "top" describes that side of the system or component that is facing upward and "bottom" is that side of the system or component that is opposite or distal the top of the system or component and is facing downward. Unless stated otherwise, "side" describes that an end or direction of the system or component facing in horizontal direction. "Horizontal" or "horizontal orientation" describes that which is in a plane aligned with the horizon. "Vertical" or "vertical orientation" describes that which is in a plane that is angled at 90 degrees to the horizontal.

Definitions

Shielding: Electromagnetic shielding is the practice of reducing the electromagnetic field in a space by blocking the field with barriers made of conductive or magnetic materials.

Grounding or Earthing: In an electrical installation, an earthing system (UK) or grounding system (US) connects specific parts of that installation with the Earth's conductive surface for safety and functional purposes. The point of reference is the Earth's conductive surface.

Electrode: In this context, an electrode is a solid conductor whether it is metal or not and regardless of its shape. It can collect or emit or transfer electrical charge or current.

Current source: A current source in this context is any source of electrical current whether it is that from normal operation of an electrical device or system, static build-up, or of that created during an electrical fault or even a lightning event. A spark or an electrical short would also serve as a fault current source.

Earthing mix: Earthing mixes are designed to improve the transfer of electrical energy (current) from a grounding electrode into the local soil. An earthing mix is either added to local soil or wholly created to replace local soil adjacent to a grounding electrode with the aim of improving the ability of the grounding electrode to dissipate electrical energy into the earth. For some applications, the goal is to just meet local electrical codes which in the USA rely on measurement of "resistance to ground" for normal usage.

Local or native soil is the soil found on the installation site.

Backfill is local or native soil from the job site, which can, but does not have to, include modified soil.

Modified soil is soil which has been modified in some way. It can be based on local soil, backfill, or it can be trucked in.

Conductive earthing mix: Conductive earthing mixes are mixtures which have been designed to increase the electrical energy (current) which can be stored in its volume or transferred to another material on its way to the local soil. It is generally a solid compound formed from minerals and other durable materials such that its electrical conductivity remains stable and is similar to brackish water.

(Impedance) Transitioning mix: Impedance transitioning earthing mixes are mixtures which have been designed to reduce mismatch of the electrical properties at one or both of its interfaces with soil or other materials including earthing mixes and electrode elements. It is generally an electrically conductive blend of materials, primarily organic, that acts in concert with the Native Soils, mimicking the rise of fall of soil conductivity with changing moisture content.

Consolidation mix: A clay-based slurry which will bond to solid clay masses and fill the interstices between them.

Capping mix: A layer of particulates which consolidates into a unit, allowing water move downward through it, while resisting the flow of vapor from below.

Diatomaceous earth: A sedimentary silicate mineral formed by petrifying the shells of diatoms (flat marine micro-organisms) leaving very fine, sharp edged porous particles.

Electrical resistance: a measure of the difficulty to pass an electric current through a conductor. It can be from either surface of volumetric resistance.

"Elongated particles" have dimensions with an aspect ratio of at least 3.

Dispersion: In this context, dispersion refers to dispersing particles of one material into another material or mix. The quantity of the newly introduced material can affect chemical, electrical, or mechanical properties of the mix and the uniformity can affect the efficiency with which these property changes occur.

Percolation in electrical systems refers to the behavior of electrical charges when they jump from one particle to another in seemingly random fashion once the distance between them is sufficiently small to allow the charge to transfer. Mixtures of materials can become conductors once there is a pathway which can be used by charge with sufficient voltage.

Semiconductors are materials which have an electrical conductivity value falling between that of a conductor, such as metallic copper, and an insulator, such as glass. Its resistance falls as its temperature rises; metals are the opposite. Its conducting properties may be altered in useful ways by introducing impurities ("doping") into the crystal structure.

Coefficient of Linear Extensibility (COLE): The linear contraction of an unconfined mass of soil when dried from a wet state to a dry state.

Organic: Materials containing Carbon chain molecules such as plant matter, fossil fuels, and peat.

Electromagnetic elongated conductive particles respond to a varying magnetic field by rotating or vibrating unless restrained in which case the equivalent energy is converted to heat.

Deflocculating agent: An ionized salt or organic material, usually in aqueous solution, that changes the surface charge on small particles such that they repel one another, lowering the viscosity of a suspension of those particles.

Barrier materials in this context act to retard or eliminate fluid passage, generally through a surface or interface.

Bandwidth is a measure of the frequency range of a system.

nano: "Nano" means small but has been adopted to mean "sub-micron" and, as "nanometer", means $10^{-12}$ meter. As applied to nanomaterials, nanoparticles, and nanostructures, it relates to materials or structures which are in the general range between 1 nanometer and 100 nanometers but often includes agglomerations of nanomaterials which exceed this top limit.

Electrically lossy medium; anything in an electrical or electronic circuit or power system that dissipates part of the energy in play by unwanted effects, including energy heating of resistive components, the effect of parasitic elements (resistance, capacitance, and inductance), skin effect, losses in the windings and cores of transformers due to resistive heating and magnetic losses caused by eddy currents, hysteresis, unwanted radiation, dielectric loss, corona discharge, and other effects.

Issues Addressed

MOISTURE RETENTION A drawback of existing systems concerns variances in soil moisture. Grounding systems typically need to interact with some moisture to be effective. However, some soils can be situated in arid environments or areas experiencing a drought and in those cases ground rods are typically not able to function as intended. Furthermore, different sites have different compositions as well as different soil depths. For example, soil near a coastline can have brackish water which can conduct current at a very low resistance (between one and two ohms), whereas only around 10 miles inland, the soil often lacks brackish water and the resistance can radically increase to as much as several hundred ohms. Such differing conditions have often caused each installation of a grounding system to be specifically designed for each site with little or no uniformity between installations at different sites.

ELECTRODE SPACING Another drawback of existing grounding systems is that their grounding electrodes must be spaced relatively far apart. In the case of ground rods, generally a spacing of at least one time the length of the ground rod being installed is required to account for code requirements which are based on treating a grounding rod as needing a certain minimum radius of soil to accommodate its electromagnetic field's "sphere of influence"; this analysis treats the grounding system as a buried antenna and optimizes the radiated energy while mostly ignoring the energy dissipated into the soil itself. This approach has the unintended effect of requiring the use of larger amounts of land to accommodate a grounding system installation for soil with higher resistance-to-ground (RTG).

IMPEDANCE MISMATCH Another disadvantage of current grounding systems concerns impedance mismatches at the interface between the grounding system's structure and the soil. The electrical property differences between these high conductivity structures and the very low conductivity soil, even when moist, causes significant reflectance of the incoming traveling charge energy 110 that is travelling away from the fault current source 101 back up into the systems being protected with current flow 130 moving against the incoming energy.

ELECTRODE EFFICIENCY Another shortcoming of current grounding systems is that their device design and installation practices limit their system efficiency. To illustrate the value of system efficiency for an electrode in soil with good RTG per installed unit of 120 ohms it would take only three grounding rods for the system to drop below 50 ohms RTG. But for grounding rods in soil showing 400 ohms RTG per installed unit it would take at least 10 such rods in that soil to drop the system below 50 ohms RTG, which requires over three times the land that is required in the better soil. An improved efficiency grounding system design would allow for the use of fewer installed units in a smaller land area at significantly lower installation cost.

There are several avenues to address the efficiency shortcomings of a grounding system including increasing the volume of the conductive grounding structure, increasing the surface area of the interface between the conductive grounding structure and the soil, improving the interface between the conductive grounding structure and the soil, increasing the number of emitting locations available associated with the conductive grounding structure, and retaining a level of moisture around the conductive grounding structure.

While larger diameter grounding structures of conductive metal would increase the capacity of a grounding system to accept higher currents (including current faults and lightning strikes) with reduced damage, the cost of larger diameter rods of solid copper or other metals combined with associated installation costs has limited their adoption. Larger diameter or longer or wider structures could also increase surface area available for current dissipation, but larger elements do not necessarily carry a proportional increase in ability to dissipate faults where the impedance mismatch is large, as is generally the case in native soil. In addition, due to the preference of electrical charge to accumulate at endpoints or edges, it also has a higher chance of entering or exiting a conductor at endpoints or edges rather than all surfaces. The degree of this preference for electrical charge to enter or exit a conductor at an edge or point is dependent on the impedance matching with and surrounding material in contact with the conductor.

In the context of electrical properties, soil's "goodness" for grounding applications is relative; the electrical conductivity of soil is far, far less than that of metals in general and copper in specific. Even "good" soil is a terrible conductor compared to the typical grounding electrode. This mismatch in electrical conductivity (and impedance) results in the energy within the grounding system having very little incentive to exit the conductive medium. It is for this reason that grounding systems are often located in moist soil, under the drip rails of buildings, or in areas where grounds keeping includes watering of the surface. Modification of the surrounding soil itself has been developed to some degree including additions of various salts and other chemicals placed in an excavation in the native soil 103 and surrounded by native soil 103 or backfill 102, as well as insertions of pipes to the surface for replenishment of these salts over time and schemes to harvest dew for moisture.

FREQUENCY RESPONSE/BANDWIDTH Common grounding systems are not able to efficiently handle the larger amounts of higher frequency current that is coming to the market with high bandwidth systems operating deep into the GHz. Historically, typical frequency content has been assumed to consist mostly of 50-60 Hz and that came from simple power supplies. This made copper a great choice as it, like most metals, is quite efficient at carrying these relatively low frequencies. Copper could even handle occasional fault currents from systems with a wide range of frequency content from the devices being protected. Copper is a good conductor of electricity in general, albeit less efficient at higher frequencies (even into the GHz range if the wire diameter is small enough). Copper's efficiency falls off rapidly in conductivity before 200 MHz which makes it barely capable of handling a large amount of lightning's 60 MHz content. In addition, induced frequencies from nearby RF generating, systems like radio towers can add additional current to the load carried by a grounding system. As frequencies are allocated to applications beyond current products, this can and will change, with the arrival of 5G cellular data and communication bringing large amounts of expected frequencies in the 20 to 30 GHz range.

Disclosed is an electrical grounding system earthing mix designed to overcome the drawbacks discussed above and below, and to provide a system that achieves results superior to those of conventional grounding systems while reducing operational costs for users, especially via reduced annual operating losses, lowering maintenance demands, and reducing customer downtime. These and other benefits are attendant to the electrical grounding system disclosed herein.

It is a principal objective of the present invention to provide a protective electrical earthing system including an electrode efficiently transfers electrical charge into and through surrounding earthing mixes which cooperatively dissipate the electrical charge while permitting long-term operation of the entire system as the market adapts to increased communications traffic and enlarges the frequency allocations available for such systems.

It is a further objective of the present invention to provide a system for electrical grounding as aforesaid which exhibits the following attributes: (1) a level of electrical conductivity throughout supporting efficient electrical dissipation; (2) a gradient of electrical properties at material interfaces supporting efficient electrical dissipation generally towards and into local soil; (3) efficient electrical energy dissipation over a broad range of current densities and frequencies; (4) retention of sufficient water to maintain a large volume of stable conductive material during changing seasons and weather conditions; (5) costs of manufacture and installation appropriate to enable long-term cost savings; and (6) minimal adverse environmental impact.

With a view to achieving these objectives and overcoming the aforementioned disadvantages of known grounding systems discussed above, the present invention provides a system utilizing earthing mixes and electrode structures that enable design of a wider range of highly efficient and broadband-capable grounding systems consistent with many differing installation types and locations with varying functionality requirements.

A typical electrical protection system, including grounding and shielding systems must provide for electrical current to be dissipated all day every day at low energy levels and usually at frequencies near 50 Hz or 60 Hz. It is common to use electrical resistance values to determine compliance with local electrical codes. Electrical impedance extends the concept of direct current (DC) electrical resistance to alternating current (AC) and allows further understanding of electrical properties at frequencies well beyond DC or 60 Hz. The electrode of an electrical grounding system, be it a copper wire, a copper-bonded steel rod, a metal plate, a mass of concrete or cement or polymer that has been made somewhat conductive, or any other electrically conductive structure, must receive electrical current from the current source via an incoming bus bar, wire, or cable, then carry the current from the current source into the electrode structure which must in turn dissipates the electrical energy into the soil. The electrical energy can be dissipated as radio frequencies, electrical current, or heat. It is also possible that sound or motion can be generated which will also result in energy dissipation. Dissipation as radio frequencies is dependent on the antenna properties of the core electrode and its surrounding materials.

The electrical energy will generally travel from higher conductivity materials into lower electrical conductivity materials until it enters the lowest electrical conductivity material regardless of routing of the path. By providing a system with multiple interfaces between different materials with various conductivity levels (which can be measured in a number of ways, including, but not limited to, electrical resistance level, electrical reactance level, electrical capacitance level, or electrical impedance level), a larger amount of electrical energy dissipation occurs. Of course, some of the electrical energy will reflect from interfaces between materials due to impedance mismatches resulting from material property changes and route back into the incoming wire and proceed towards the current source. At very high energies, including those occurring during a lightning event, an electromagnetic field will somewhat reduce the development of electrical pathways strongly diverging from the present course of the electrical energy. The electrode of the electrical grounding system is generally buried in the local soil, which results in a mismatch between the core electrode's electrical properties and that of the local soil (see FIG. 1). The mismatch results in some current being redirected towards its source (See FIG. 2). Much of the rest of the arriving energy is dissipated into the soil. It is at this point that modifications to the local soil can provide some energy storage and aid in local energy dissipation.

The reflected energy from an interface between two materials with an impedance mismatch travels away from that interface in the direction from which it came, generally towards the electrical system the grounding system is meant to protect. Fortunately, each layer of material, be it a wire, a grounding system substructure, or an earthing mix, is not a perfect conductor and will result in a new opportunity to dissipate energy along that path. In addition, each material interface with an impedance mismatch along this path also offers an opportunity to reflect some of this previously reflected energy back towards the local soil. It can be a complicated process to manage.

Methods will be disclosed to reduce the reliance on antenna behavior of the grounding system and instead rely more than done historically on a larger conductive mass and improved impedance matching with the soil to dissipate energy. These include improvements to the earthing mixes as well as the grounding system's core electrode structure, enlarging the grounding structure itself to contain more conductive volume and core electrode surface area, providing for additional charge emission points (and edges), and improvements in earthing mixes to address electrical conductivity, moisture content and retention, and gradient electrical properties.

The present invention includes methods and components to improve the impedance mismatch across the diameter or thickness of earthing mixes and their structures to reduce reflectance of electrical energy at interfaces and improve overall energy dissipation efficiency into the soil. In an aspect, the addition of conductive particles of one or more dimensions and providing for gradient electrical properties by layering using multiple conductive layers with lower conductivity closest to the soil or by tapering additive content in a sheet or ribbon of material and wrapping it around the core electrode of the grounding system with the lower conductivity sections closest to the soil. Achieving an optimal reflectance reduction includes considering electrical conductivity, electrical reflectance, or electrical impedance similarly to designing a thick film anti-reflection coating for optical elements or optimizing radar absorption coatings. The relevant electrical properties of these layers of materials matter over their thickness and at their interfaces.

The electrical protection earthing system of the present invention is configured to utilize a variety of components including different materials in to order to increase energy dissipation more effectively across a broad range of frequencies while greatly reducing maintenance. The electrical protective earthing system includes an electrode and an earthing mix. The core electrode can include a number of different materials. Similarly, the earthing mix can include multiple mixes with various purposes. In some aspects, the earthing mixes can include a conductive earthing mix that is configured to be placed adjacent to the electrode when the electrode is placed within the native soil. In addition, the earthing mixes can include an impedance transitioning earthing mix as well. The impedance transitioning earthing mix can be placed between the conductive earthing mix and the native soil within the ground. Additional earthing mixes can be included. Further, the electrode can be connected to a current fault source to form an electrical grounding system. In some aspects, the electrical protection earthing system can operate as a shielding system when the electrode is not connected to a fault current source. In some aspects, various materials, including clays and elongated particles, can be used to help retain water. These and other aspects of the electrical protection earthing system are discussed in detail below.

Figure 5A:
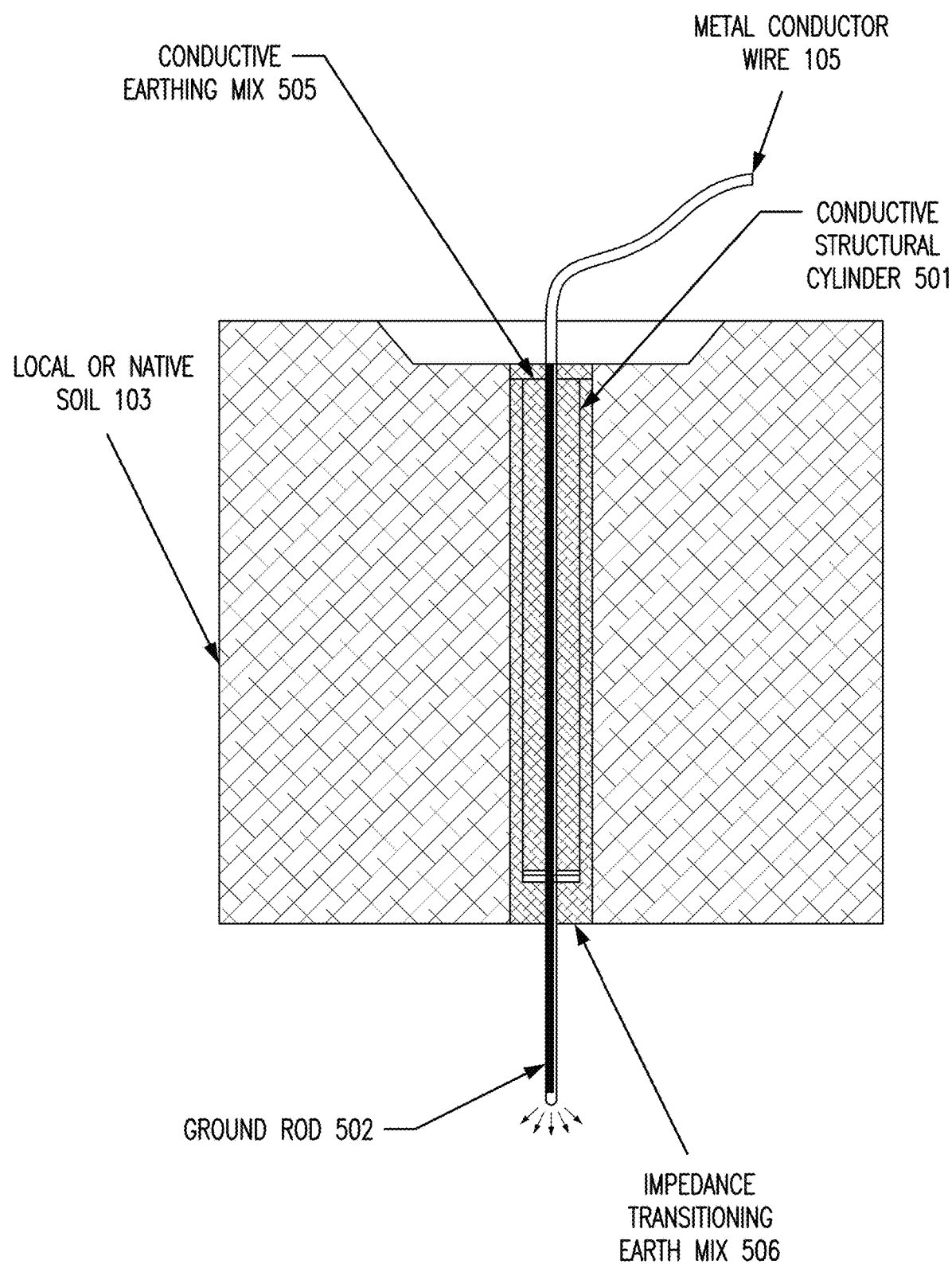
FIGS. 5A-B illustrate an electrical protective earthing system according to an aspect of the present invention.
Figure 5B:
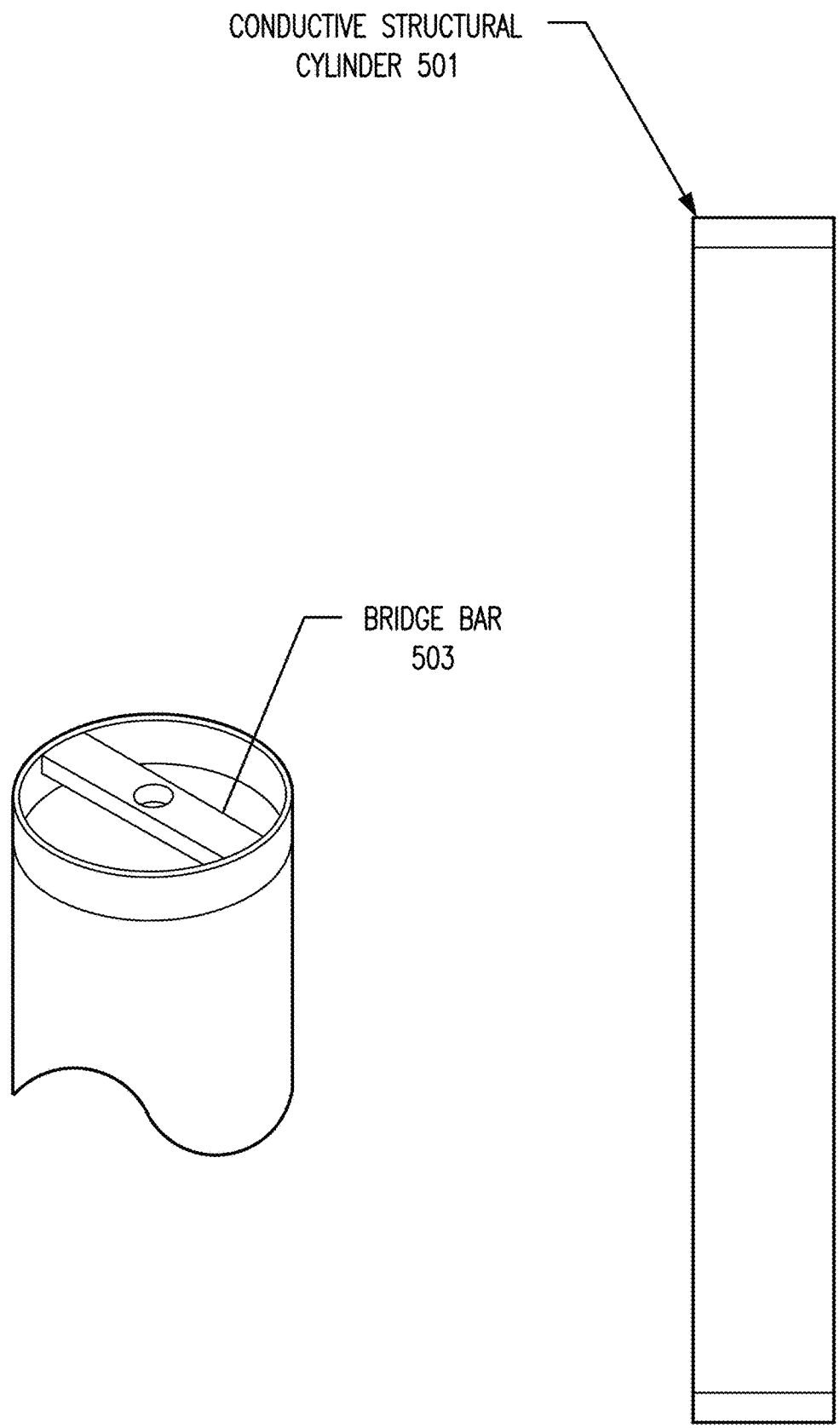

In an aspect, the electrode can be more complicated than a simple rod or plate. The electrode may be porous or non-porous. The electrode can have multiple geometries, including, but not limited to, an electrically conductive rod 502 centered on an electrically conductive hollow cylinder 501 electrically connected by a bridge or buss bar 503, as shown in FIGS. 5A-B. Each of the three core electrode elements, the rod 502, the bridge 503, and the hollow conductive structural cylinder 501 must all conduct electricity. In an aspect, the components can be made of copper. As the earthing mixes, discussed below, to be used must be in electrical and fluid contact, it is preferred that the hollow conductive structural cylinder 501 be at least partially porous to water. The hollow cylinder 501 may be made of multiple subcomponents as long as the resulting core structure is electrically conductive.

In other aspects, the electrode includes an electrically conductive plate and an electrically conductive bag surrounding the entire plate and electrically connected to each other with a washer and bolt. The electrically conductive hollow cylinder and the electrically conductive bag may be porous. Each of the four electrode elements, the rod, the washer and bolt, and the porous or non-porous bag must all conduct electricity. However, the components do not need to be made of the same material. Some components can be configured for higher frequency bandwidths than others. For example, the washer and bolt can include stainless steel while the plate includes copper. The porous electrically conducting bag can include copper mesh or carbon fiber cloth. As any earthing mixes to be used must be in electrical and fluid contact, the bag must be at least partially porous to water.

Various electrically conductive materials are used for the electrode and practical needs including malleability, drapeability, formability, corrosion properties, and magnetic properties. Corrosion drives many choices as many metals, while electrically conductive, require replacement after several years due to corrosion. For example, in residential applications, a copper-bonded steel rod or a buried copper plate is often used for its low cost and relatively low corrosion rate. For a lightning prone region, a large array of copper-bonded ground rods might be used in an attempt to increase the volume of soil over which the energy can be distributed. Even though it may suffer from corrosion and limited connection to the soil, rebar in the foundation of a building is often used as a grounding system partly because it is available and partly because it is may provide better grounding than a simple ground rod in the local soil. One could also consider a carbon fiber ground rod as a long lasting, corrosion resistant ground rod with the tradeoff being that it is not nearly as electrically conductive as copper or steel for typical residential and industrial applications. Materials include, but are not limited to, copper, steel, molybdenum, carbon fiber (for example, PAN-based fibers for higher electrical conductivity and pitch-based fibers for lower electrical conductivity), and conductive composites of carbon fiber or other conductive material, e.g., electrically conductive particles including carbon powder or silicon carbide and elongated electrically conductive particles including chopped metal wires or carbon fibers or milled carbon fibers.

Figure 2:
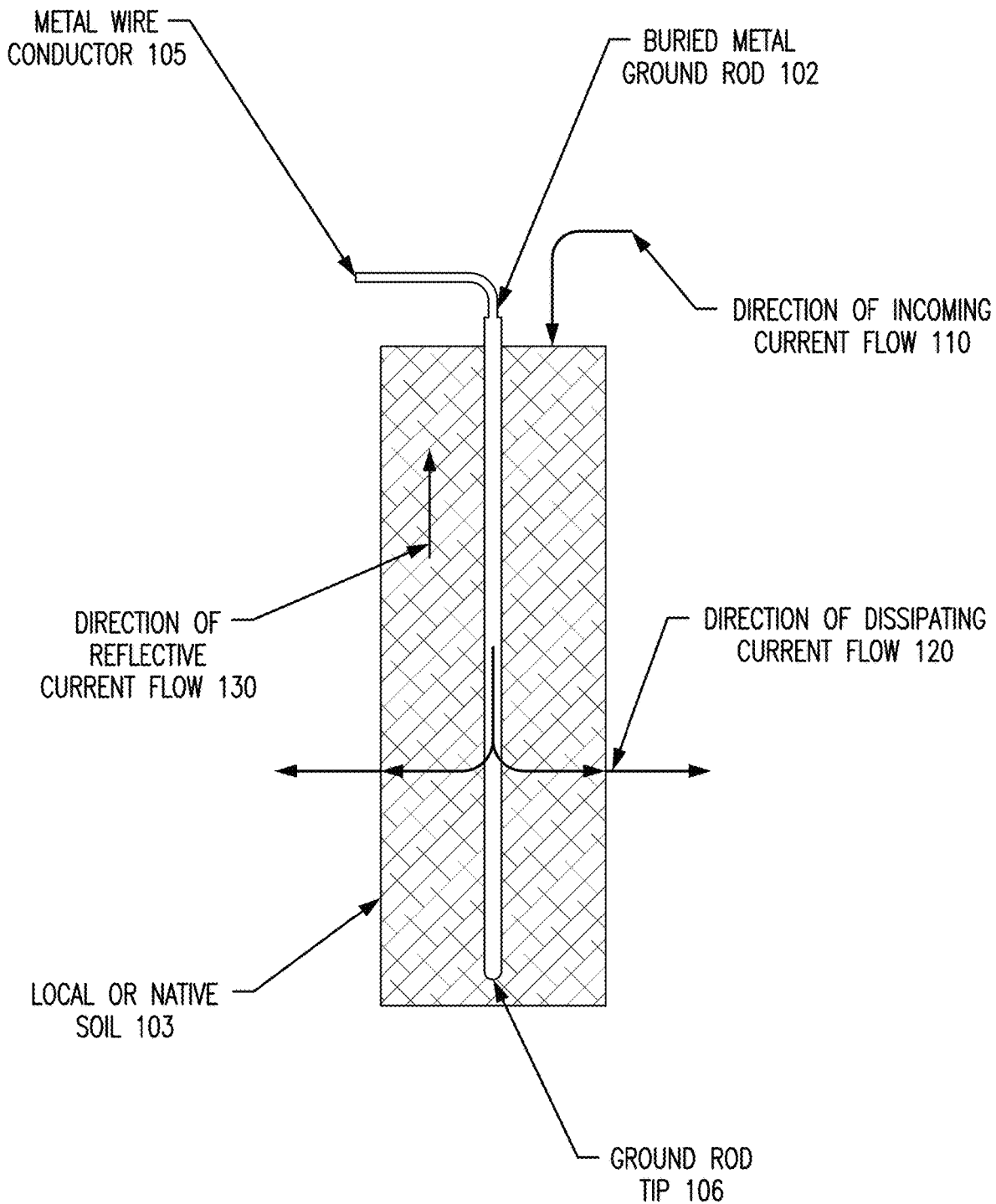
FIG. 2 illustrates the flow of electrical energy within the grounding system of FIG. 1

IMPEDANCE MISMATCH AND EMITTERS, Recent work (LaBarge 2019) showed improvements gained from enlarging the grounding system to include additional grounding electrode surface contact with earthing mix (soil replacement material) near the buried electrode and significantly enlarged the surface contact area using a conductive fiber cloth, while also greatly increasing the number of electrical charge emission locations using both tips of each conductive fiber in the conductive fiber cloth as an emitter. The reflectance from each of these small emitters can be managed with impedance matching materials. FIG. 2 shows additional strong reflection available from the far end of the common grounding electrode that results from the impedance mismatch at that interface between the grounding rod 102 and the local soil 103. The mismatch causes the incoming current proceeding through the ground rod 102 in the incoming direction HO to produce a reflected current proceeding in the opposite direction 130. The ground rod end reflection can be mitigated with impedance matching materials added at the tip 106 of the ground rod 102.

There are many ways to similarly increase the number of emitters which are part of the grounding system's structure which include replacing the structure or creating in place or attaching additional electrically conductive structures to an existing surface. Examples of these structures include parallel carbon nanotubes which have been grown aligned in parallel ("vertically-aligned CNTs"), laser-induced graphene platelets, and simple carpet-like structures of carbon fiber or metal wire.

Certain carbon-based nanostructures are known to have high conductivity at high frequencies and even some carbon fibers are reported to have as much as 70% of the electrical conductivity as copper at lower frequencies. One result of metals including copper becoming less efficient at carrying current at higher frequencies is that the metal begins to heat up due to its generally increased electrical resistance at these frequencies. Carbon, on the other hand, will heat up preferentially at lower frequencies as it is generally more resistive at lower frequencies.

Figure 16:
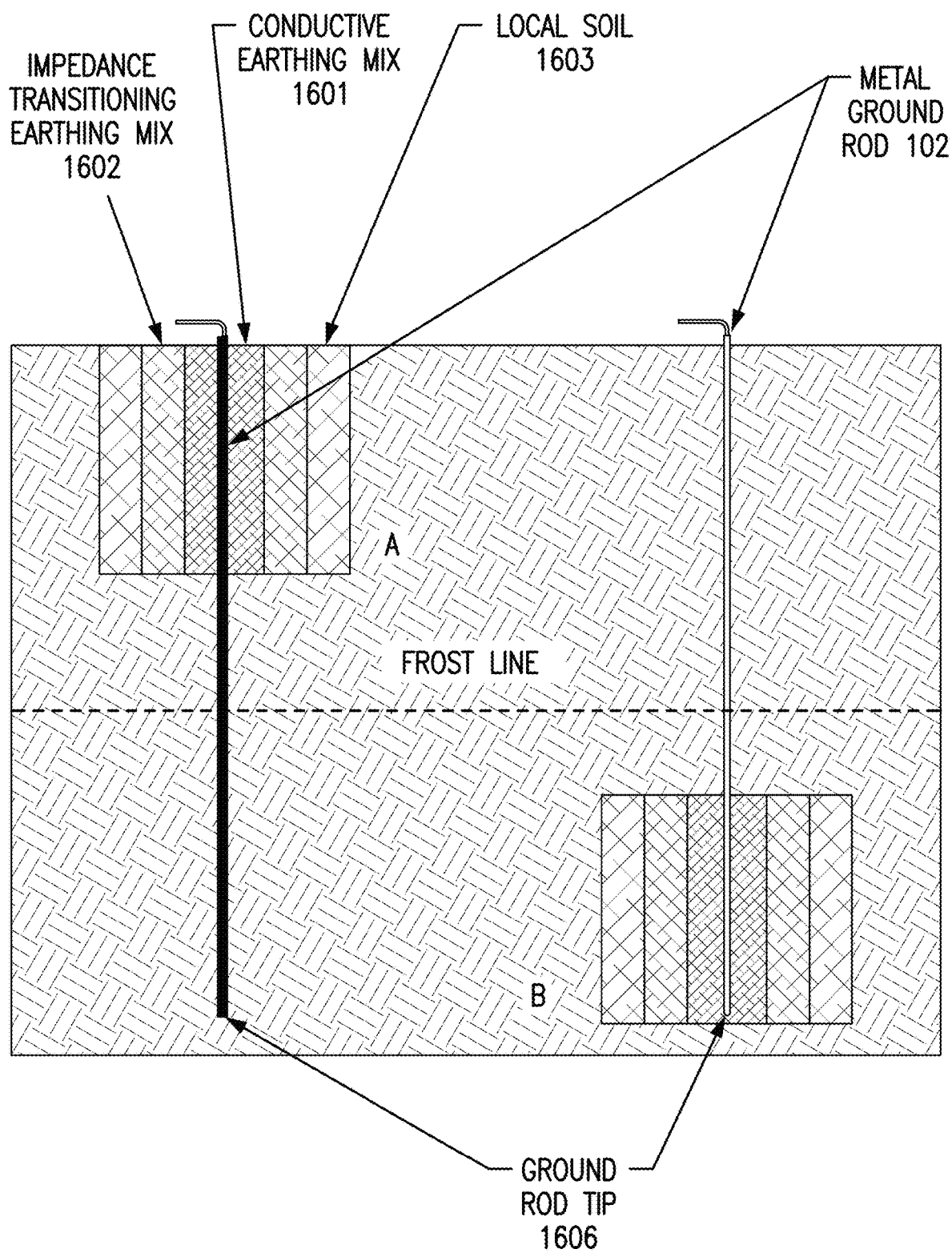
FIG. 16 shows two grounding electrode installations according to an aspect of the present invention.

Further, electrodes of the electrical protective earthing system can generally be buried in any orientation: the electrode can be placed in a., including, vertical or horizontal orientation, and any angle in between. In addition, the electrode can be placed at any depth in the local soil in a hole or pit or in a trench with rocky terrain or frost line considerations sometimes driving the decision as to depth and orientation, as shown in FIG. 16.

In additional cases, the electrode could attach to or wrap around another structure (e.g., a pole installed to carry power or telephone wires) and be brought into electrical communication with the local soil within the act of the structure being buried. In this case, the electrode may only be in partial communication with the local soil.

In another aspect, the electrode or the entire electric protection earthing system itself is separate from any incoming ground wire, acting as a stand-alone grounded structure. This is useful when the purpose of the system is to intercept local electromagnetic waves from a first source of a first electrical system by reducing or eliminating energy from the first source reaching a second electrical system. This occurs when one wire or cable or structure in communication with one source is in proximity of another wire or cable or structure in communication with a second source as might occur when a power cable crosses a signal line. In this fashion, a first unconnected electric protective earthing grounding system can be designed to dissipate much if not all of the electromagnetic energy impinging upon it into the local soil prior to its being absorbed by another electrical system.

A grouping of earthing mixes can be used to partially separate the required multiple functionalities of the electrical protection earthing system including moisture retention, energy storage/capacitance, impedance matching of electrode to the local soil, low corrosion of the electrode components, electrical charge dissipation efficiency, and system frequency response/bandwidth. Earthing mixes in general increase the electrical conductivity of the region around the electrode. Their primary purpose is to improve the dissipation of electrical energy into the surrounding soil but their contact with the electrode brings additional considerations. The earthing mixes can be designed to reduce corrosion of the metal conductors via addition of chemicals containing the at-risk metals (e.g., copper sulfate added to systems made with copper), addition of sacrificial anodes, avoiding conductive materials which corrode wherever possible, and avoiding dissimilar conductive materials as much as possible. The earthing mixes can be designed to manage local energy storage or manage electrical energy pathways to the local soil. They can be filled with conductive material or chemicals or ions to carry electrical charge. They can be filled with thermally conductive materials or thermal energy storage materials. They can also be designed to retain water through strong attraction to water molecules or reducing the occurrence of micro-cracks which provide moisture with a pathway to escape. They can also be designed to reduce occurrence of burrowing insects.

The earthing mixes and their interfaces play important roles in determining the amount of current that is reflected at that interface back out the incoming current wire metal conductor 105 towards the fault current source 101. The interface between porous or non-porous surfaces of the electrode and the conductive earthing mix will preferentially provide for electrical current to cross the interface more efficiently than the copper-to-local soil interface. To achieve this, various earthing mixes are designed to have electrical conductivity values higher than that of the local soil where it is in contact with the electrode. For best results of impedance matching where the electrode shown in FIGS. 5A and 5B as a combination of conductive structural cylinder 501, bridge bar 503, and ground rod 502, interfaces the conductive earthing mix 505, the conductive earthing mix 505 should have electrical conductivity less than or equal to that of the electrode 501. Similarly, at the interface where the conductive earthing mix 505 and the impedance transitioning earthing mix 506 meet, the electrical conductivity of the impedance transitioning earthing mix 506 should be between the electrical conductivity of the conductive earthing mix 505 and the electrical conductivity of the local soil 103. It is desirable that the conductive structural cylinder 501 be porous to some degree to facilitate this interface. Furthermore, all of these conditions need to be true simultaneously in spite of the rise and fall of electrical properties of the electrical conductivity changes of the conductive earthing mix 505, the impedance transitioning earthing mix 506, and the local soil 103 over time and over seasons. In addition, the electrical properties of the thickness of each material and its impact on the resulting reflected current flow leaving the electrical grounding system needs to be considered.

In an aspect, the earthing mixes can include a conductive earthing mix, and an impedance transitioning earthing mix. In some aspects, the earthing mixes can also include a consolidation mix and a top capping mix. The first conductive earthing mix is adjacent to an electrode and it's electrical conductivity must be as high as possible even if it exceeds the electrical conductivity of the electrode itself at any frequency; the electrode must be at least partially porous and the electrical conductivity of the first conductive earthing mix must be higher than that of the adjacent impedance transitioning earthing mix. A good range of electrical resistivity values for the conductive earthing mix is $2.8 \times 10^{-8}$ ohm-meters to $2.0 \times 10^{-1}$ ohm-meters with resistivity less than $5.0 \times 10^{-4}$ ohm-meters being preferred.

An impedance transitioning earthing mix 506 then surrounds the cylinder or, in the case of a plate, the transitioning earthing mix 506 either surrounds the conductive earthing mix 505 or a porous conductive electrode sub-element which surrounds the conductive earthing mix 505. The primary purposes of this impedance transitioning earthing mix include providing a surface area of similar or larger dimension than that of the conductive earthing mix, providing a gradient of electrical properties at material interfaces supporting efficient electrical dissipation generally towards and into local soil, and providing a barrier to water loss from the conductive earthing mix. One or more layers of the impedance transitioning earthing mix surround or are placed adjacent to the conductive earthing mix where each layer further from the core structure has electrical properties between that of its preceding layer and the local soil. The first and hence lowest resistance impedance transitioning earthing mix should not be less resistive than conductive earthing mix and should have a range between $2.8 \times 10^{-8}$ ohm-meters and $2.3 \times 10^5$ ohm-meters; in practice, if a single layer of impedance transitioning earthing mix is used, its electrical resistivity should fall between $10^{-2}$ and $10^{-5}$ ohm-meters.

During installation, a consolidation mix replaces air spaces with a conductive fluid whose electrical properties are based on the presence of metal salt content and electrically conductive particles and need not vary far from the recipe in Table 4 for optimal function electrically and otherwise. A top capping mix restricts evaporation to help maintain moisture content within the grounding system.

One or more earthing mixes are used in and around the core electrode to provide (1) a path for conductive electrical charge to make its way to a large surface area; (2) retention of sufficient water to maintain a large volume of stable conductive material during changing seasons and weather conditions, and (3) provide a level of electrical conductivity throughout supporting efficient electrical dissipation generally towards and into local soil.

In an aspect, elongated conductive particles can be included in the earthing mixes. The elongated conductive particles dissipate electrical energy in part by acting as transmission antennas for radio frequencies, and can be treated as simple monopole antennas which relates their strongest emission frequency to the speed of light in that medium divided by the length of the elongated conductive particle. This can be extended to a range of frequencies by recognizing that the elongated conductive particle as an antenna can support other frequencies broadly around this nominal frequency. This broadband behavior can be further extended by using multiple lengths and diameters of elongated conductive particles.

Figure 4:
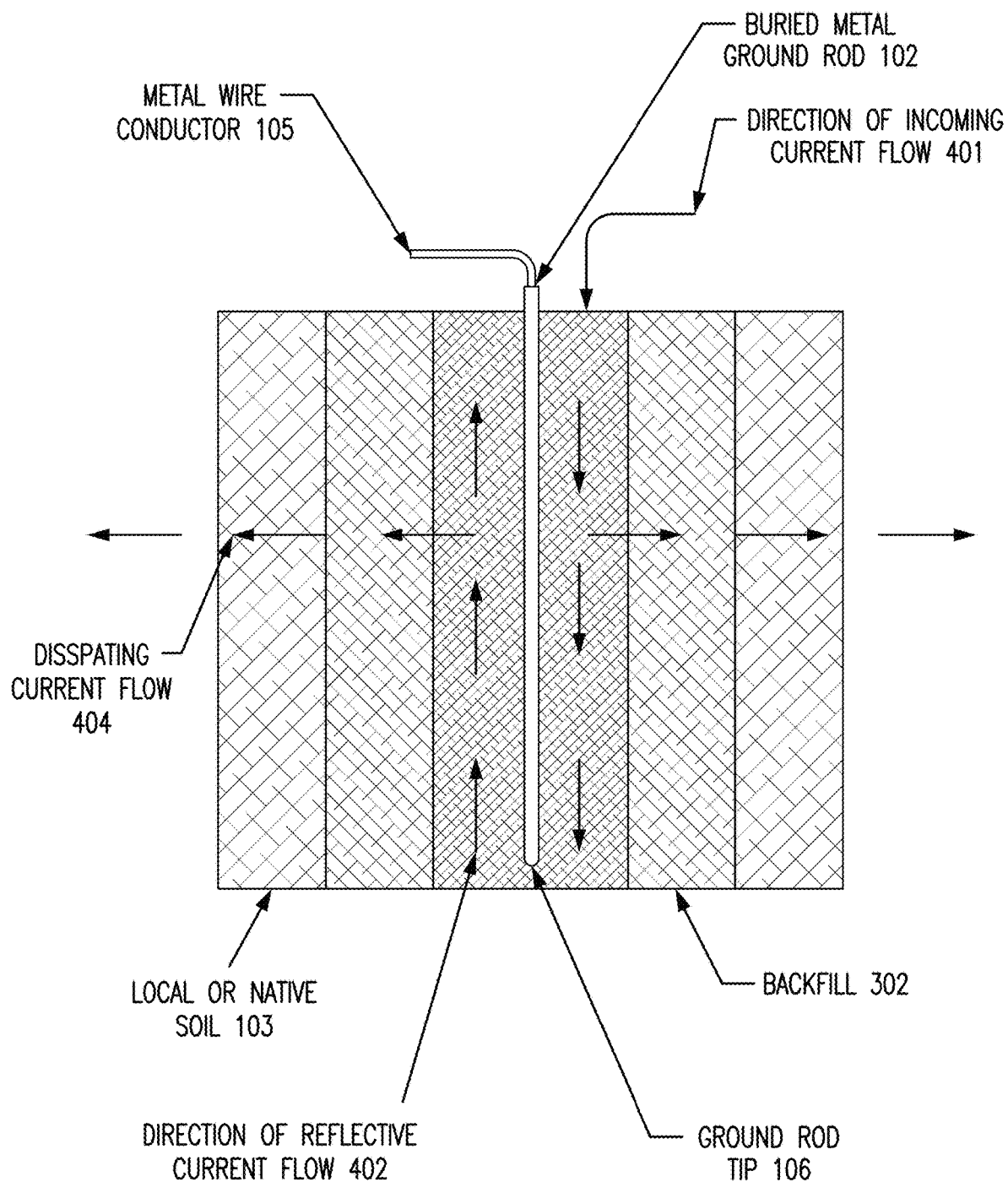
FIG. 4 illustrates the flow of electrical energy within the electrical earthing system of FIG. 3.

In an aspect, the earthing mix, which can be called an electrolytic fill, immediately in the vicinity of the electrode can include more highly conductive material than native soils offer to dissipate electrical energy. The electrical energy is dissipated though the system during both the initial pass through an electrode surrounded by the earthing mix and during any subsequent reflected pass through the same electrode, such that current must pass along the earthing mix-electrode interface twice; the first pass is shown in FIG. 004.

In an aspect of the electrical protective earthing system, the earthing mix/electrolytic fill immediately in the vicinity of the electrode includes two or more earthing mixes/layer types. In some aspects, a slurry/consolidation mix, can be included in the earthing mixes as well. The earthing mix/layer type adjacent to the electrode is a relatively high, in relation to the local soil, electrical conductivity earthing medium or mix ("conductive earthing mix"). The conductive earthing mix absorbs and temporarily stores some of the energy during use or from an electrical fault or another earthing layer medium or earthing mix. The other earthing mix ("impedance transitioning earthing mix") is located between the conductive earthing mix and the surrounding local/native soil. The impedance transitioning earthing mix is designed to reduce the impedance mismatch between the conductive earthing mix or the electrode and the local/native soil. FIG. 5A shows an example of the arrangement and includes an optional conductive hollow cylinder as part of the electrode.

The conductive earthing mix is designed to conduct and store electrical energy during usage. The conducting earthing mix is configured to have electrical properties that better match the impedance values at the interface of the electrode and conductive earthing mix and the interface between the conductive earthing mix and the impedance transitioning earthing mix/composition, generally about half way between the effective values of the other materials at those interfaces, whether the interfaces are as described and whether or not the materials used include metal or non-metal conductors. If the electrical impedance, electrical conductivity, or electrical resistance of conductive earthing mix lies between that of the other two materials meeting at its interfaces, the efficiency of the electrical protective earthing system will be higher based on reduced back reflections of electrical energy.

In an aspect, the impedance transitioning earthing mix/composition can include more than one layer. The impedance transitioning earthing mixes can be concentric or wrapped for use with cables or rods or otherwise layered for use with plates or cables or rods. Regardless of the form, the impedance transitioning earthing mixes are configured to have better electrical properties at their interfaces than the electrode/native soil interface and the conductive earthing mix/native soil interface. Optimally, any sub-layers in the impedance transitioning earthing composition would gradually change the overall impedance transitioning layer's impedance to better match the interfaces at both outer surfaces of the impedance transitioning earthing composition's layer(s).

In an aspect, the conductive earthing mix can include a clay selected from the group of Montmorilinite, Bentonite, Illite, Smectite and Attapulgite and blends thereof. In such aspects, the clay is present in the conductive earthing mix in a range from and including 50% by weight to and including 99% by weight. In another aspect, the conductive earthing mix can include a plurality of elongated conductive particles (ECPs). In an aspect, each ECP ranges from one nanometer to three centimeters in length and has an aspect ratio of at least three. The ECPs are made of materials including, but not limited to, carbon fiber cuttings, nickel-plated polymer fibers, gold, copper-sulfate treated copper, boron fibers, conductive polymer fibers, carbon mesh, chopped metal wires including 8 micron steel fibers, other chopped metals including magnetic shielding materials like MuMETAL®, stainless steel fibers, nickel nanostrands, carbon nanotubes, electromagnetic elongated conductive particles, and semiconductors, and blends thereof. When present in the conductive earthing mix, the ECPs range from and including 0.05% by weight to and including 8% by weight. In an aspect, the conductive earthing mix includes a metal salt. The metal salt includes, but is not limited to, magnesium sulfate, calcium sulfate, copper sulfate, and calcium carbonate, and blends thereof. The metal salt is present in the composition from and including 1% by weight to and including 50% by weight. In some aspects, the conductive earthing mix includes electromagnetic elongated conductive particles (EECPs) that make up a subset of the ECPs. The EECPs are comprised of a material including, but not limited to, nickel, iron, carbon nanotubes, cobalt, aluminum, uranium, platinum, copper, brass, lead, ferrite, hematite, and blends thereof.

In an aspect, the impedance transitioning earthing composition is a blend of fibrous organic compounds, including, but not limited to, peat, rice hulls, peanut hulls, cellulose, and similar fibrous mixtures. The organic compound, when present, can make up 50% to 99% by weight of the dry weight of the impedance transitioning earthing mix. In some instances, the impedance transitioning earthing mix can include a metal salt. The metal salt can include bentonite, which can make up to 25% by weight of the impedance transitioning earthing mix. When other metal salts, including, but not limited to, magnesium sulfate, calcium sulfate, calcium carbonate, and copper sulfate, can make up 40% by weight. In some aspects, the impedance transitioning earthing mix includes elongated conductive particles (ECPs), making up between 0.1% and 10% by weight. The ECPs are made of materials including, but not limited to, carbon fiber cuttings, nickel-plated polymer fibers, gold, copper-sulfate treated copper, boron fibers, conductive polymer fibers, carbon mesh, chopped metal wires, nickel nanostrands, carbon nanotubes, and semiconductors, and blends thereof. In another aspect, the impedance transitioning earthing mix can include all of the components discussed above, but with the ECPs with non-electrically conductive particles to allow fluid and ion flow in the layer closest to the local soil without appreciably increasing that layer's electrical conductivity.

In another aspect, the earthing mixes include a consolidation mix/consolidation slurry. The consolidation mix includes comprises a clay selected from the group of Montmorillonite, Bentonite, Illite, Smectite and Attapulgite and blends thereof. The clay is present in the consolidation mix in a range from and including 1% by weight to and including 40% by weight. In an aspect, the consolidation mix includes a plurality of electrically conductive macro-, micro-, and nano-scale conductive particles 0.05% by weight to and including 5% by weight. The conductive particles can be comprised of materials including, but not limited to, gold, nickel, copper (mixed with graphene or otherwise treated to restrict corrosion), allotropes of carbon (including graphite, carbon black, carbon nanotubes, reduced graphene oxide, and graphene), allotropes of boron. In an aspect, the consolidation mix includes elongated conductive particles (ECPs), with each ECP ranging from one nanometer to three centimeters in length and having an aspect ratio of at least three. The ECPs are made from materials including, but not limited to, carbon fiber cuttings, nickel-plated polymer fibers, gold, copper-sulfate treated or graphene coated copper, boron fibers, conductive polymer fibers, carbon mesh, chopped metal wires, nickel nanostrands, carbon nanotubes, and semiconductors, and blends thereof. The ECPs are present in the composition in a range from and including 0.5% by weight to and including 5% by weight. In an aspect, the consolidation mix includes a metal salt selected from the group of magnesium sulfate, calcium sulfate, copper sulfate, and calcium carbonate, both hydrated and anhydrous, and blends thereof. The metal salt can be present in the composition from and including 10% by weight to and including 40% by weight. In an aspect, the consolidation mix can include a kaolinite-based clay mineral in a range from and including 0.5% by weight to and including 90% by weight, which increases the water retention of the system.

In an aspect, either the local soil or the earthing mix immediately in the vicinity of the electrode acts as an electrically lossy medium and dissipate electrical energy from the reflected energy from any source including another grounding system. Electrical charge can be dissipated in terms of electrical energy amplitude and filtered in terms of frequency content as it moves through the electrical protection earthing system from the electrical supply towards the earth. As electrodes of any structure type are generally connected in parallel (see FIG. 6), each electrical protection earthing system acts as grounding systems independently (see FIG. 7). Each of the grounding electrode subsystems is designed to dissipate different frequencies using different earthing mixes in and around the electrode structures. Alterations to the electrode structure itself could also provide differing frequency dissipation behaviors.

When a grounding electrode's input is attached to the buried end of another electrode electrically closer to the electrical source (see FIG. 8), any reflected energy from the farther grounding system will pass through the structure of the closer grounding system and be exposed to its adjacent lossy medium and dissipated in amplitude and filtered in frequency as it travels back towards the original source of the energy.

In another aspect, the electrical protective earthing system is buried at-or-near the perimeter or the building or tower being protected. In this case, a ground cable may be buried in a trench or conductive cement, concrete, or polymer mix may be buried in a trench.

In another aspect, the native soil can be amended to mimic the properties of the electrical protective earthing system, through excavation of the soil, blending it with ECPs and returning it to the excavation where it surrounds the conductor, which is in communication with the fault current.

Figure 3:
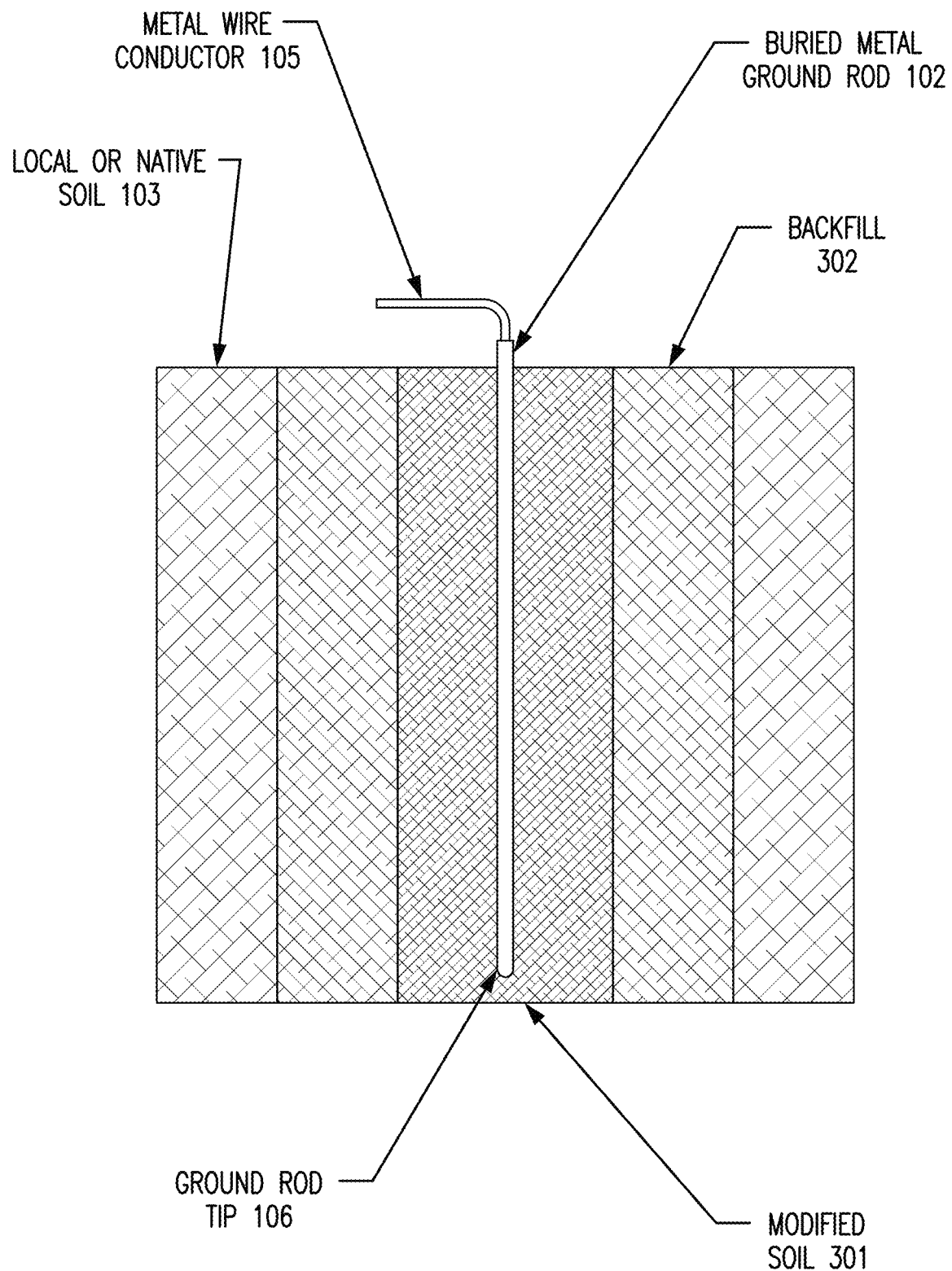
FIG. 3 illustrates an electrical earthing system according to an aspect of the present invention.

Various implementations described in the present disclosure can comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations can be realized and obtained by means of the systems, methods, features particularly pointed out in the appended claims. These and other features will become more fully apparent from the following description and appended claims, or can be learned by the practice of such exemplary implementations as set forth hereinafter.
Embodiments of the Earthing Mixes, Impedance Transitioning Earthing Composition, and Installation Steps FIG. 3 shows a similar system as shown in FIG. 1 except the soil around the buried metal ground rod 102 has been modified (modified soil 201) to better dissipate electrical energy and backfill soil 202 has been installed in place of some of the original local or native soil 103.

FIG. 4 illustrates a similar system as shown ins FIG. 2, but where a portion of the soil around the buried metal ground rod 102 has been replaced with an earthing mix (modified soil 301) and the dissipating current flow 304 crosses the interfaces between the ground rod 102 and the modified soil 301, the modified soil 301 and the back fill 302, and the back fill 302 and the local or native soil 103. The path of the incoming electrical energy is shown via the direction of incoming current flow 301 as is the direction of reflective current flow 302 from the tip 106 of the ground rod 102.

FIG. 5A shows a typical installed grounding electrode device as contemplated in this recital. It shows a conductive hollow cylinder 501, with a ground rod 502 passing through the interior of the cylinder 501 secured to the cylinder 501 by a bridge bar (bus bar) 503. The metal conductor wire 105 is attached to the ground rod 502 and bridge bar 503, and the remaining interior of the conductive cylinder is filled with a conductive earthing mix 505, and the volume between the conductive structure and the native soil 103 is filled with an impedance transitioning earthing composition 506.

Figure 6:
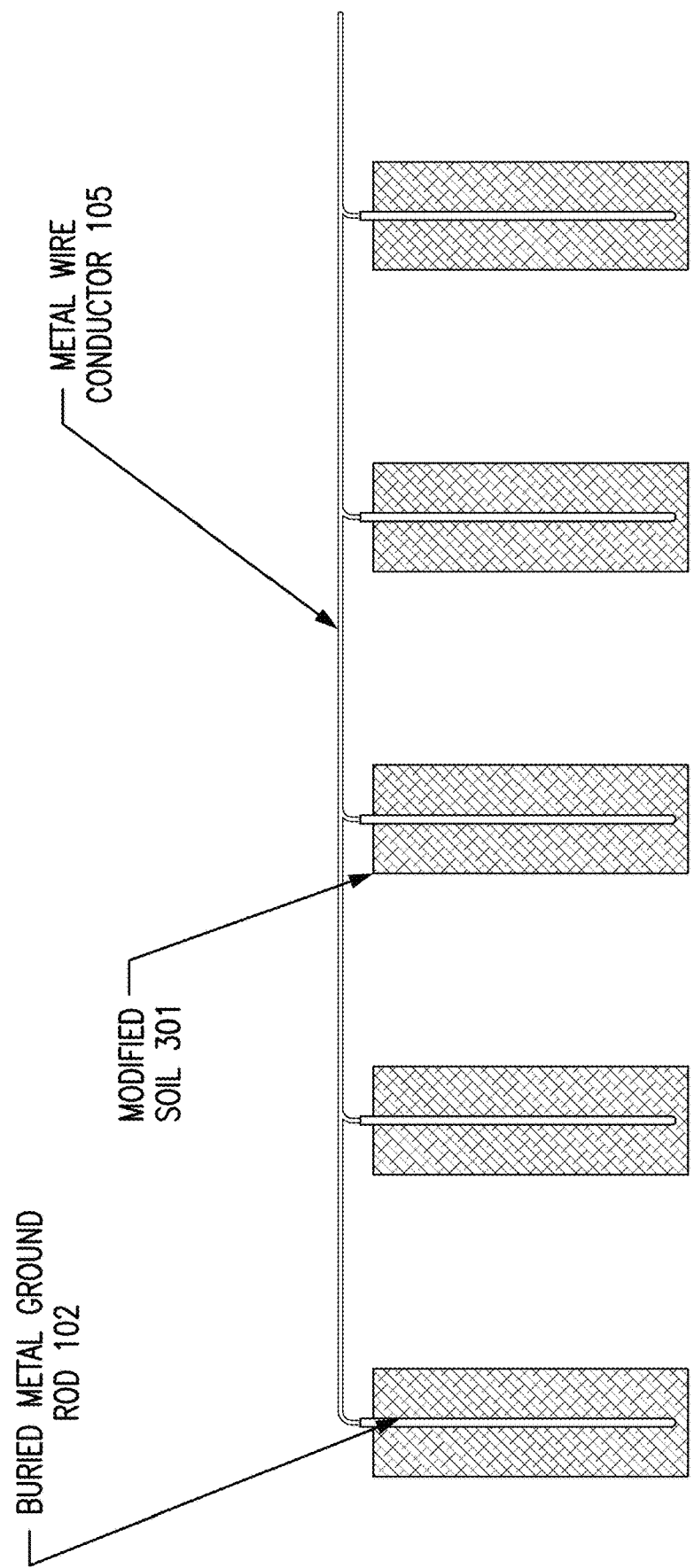
FIGS. 6-7 illustrate parallel arrays of the electrical protective earthing system of FIG. 3 according to aspects of the present invention.

FIG. 6 shows an electrically parallel array of the grounding electrode device from FIG. 4, wired in a conventional installation for the purpose of reducing the resistance-to-ground (RTG). Metal wire conductor 105 introduces fault current from a fault current source to ground rods 102 surrounded by modified soil 201. Modified soil 201 could be replaced with layered conductive earthing mix 505 and impedance transitioning earthing mix 506. The individual electrodes are not required to be physically parallel to be electrically parallel.

Figure 7:
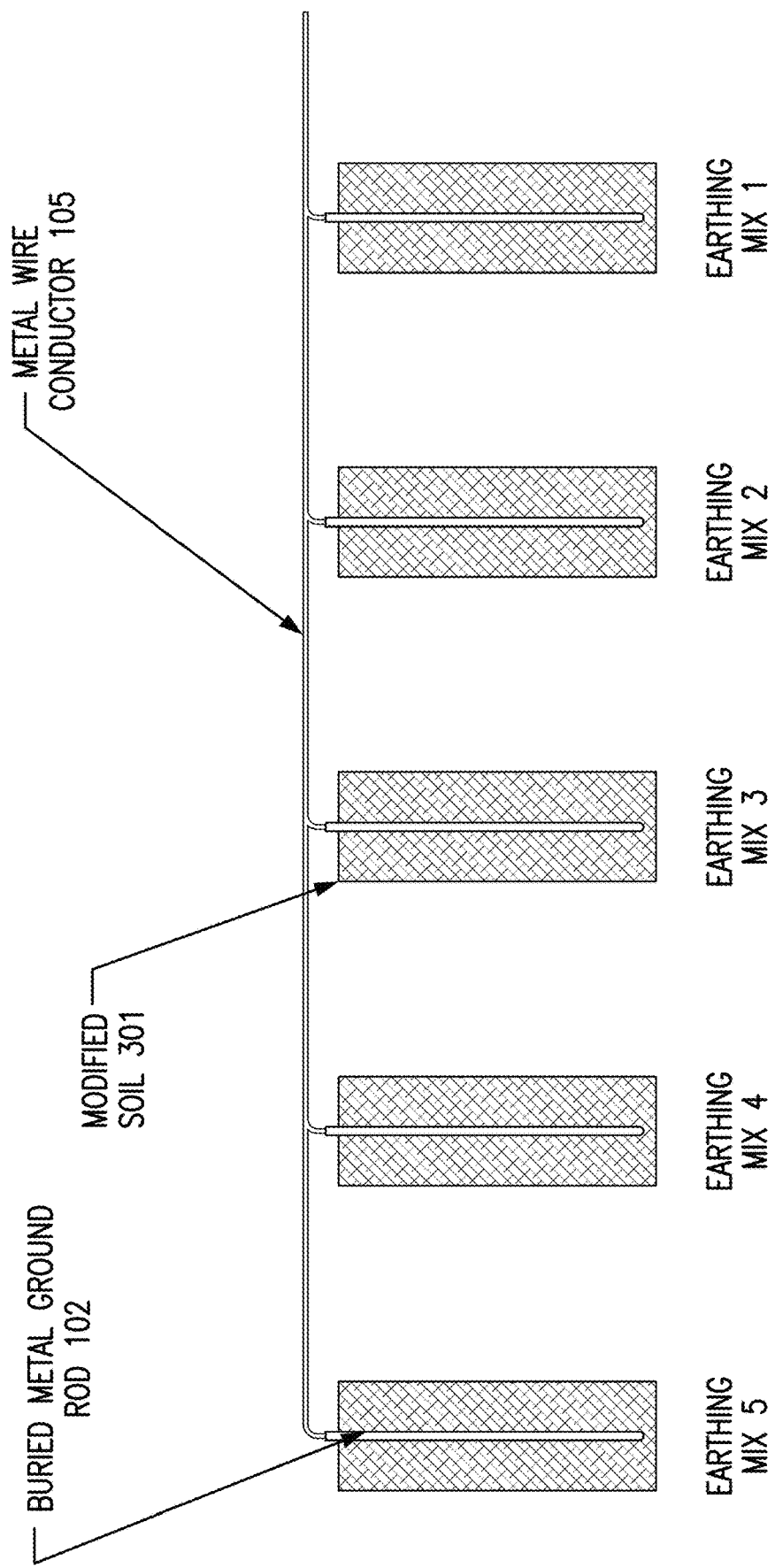

FIG. 7 shows the same electrically parallel array of grounding electrode devices of FIG. 6 with each member of the array configured to improve the array's response to a particular frequency range using modified soils which vary in electrical properties by design. The modified soils 201 can include earthing mixes 505, 506, which could be tailored to better handle dissipation of fault energy over a specific frequency regime.

Figure 8:
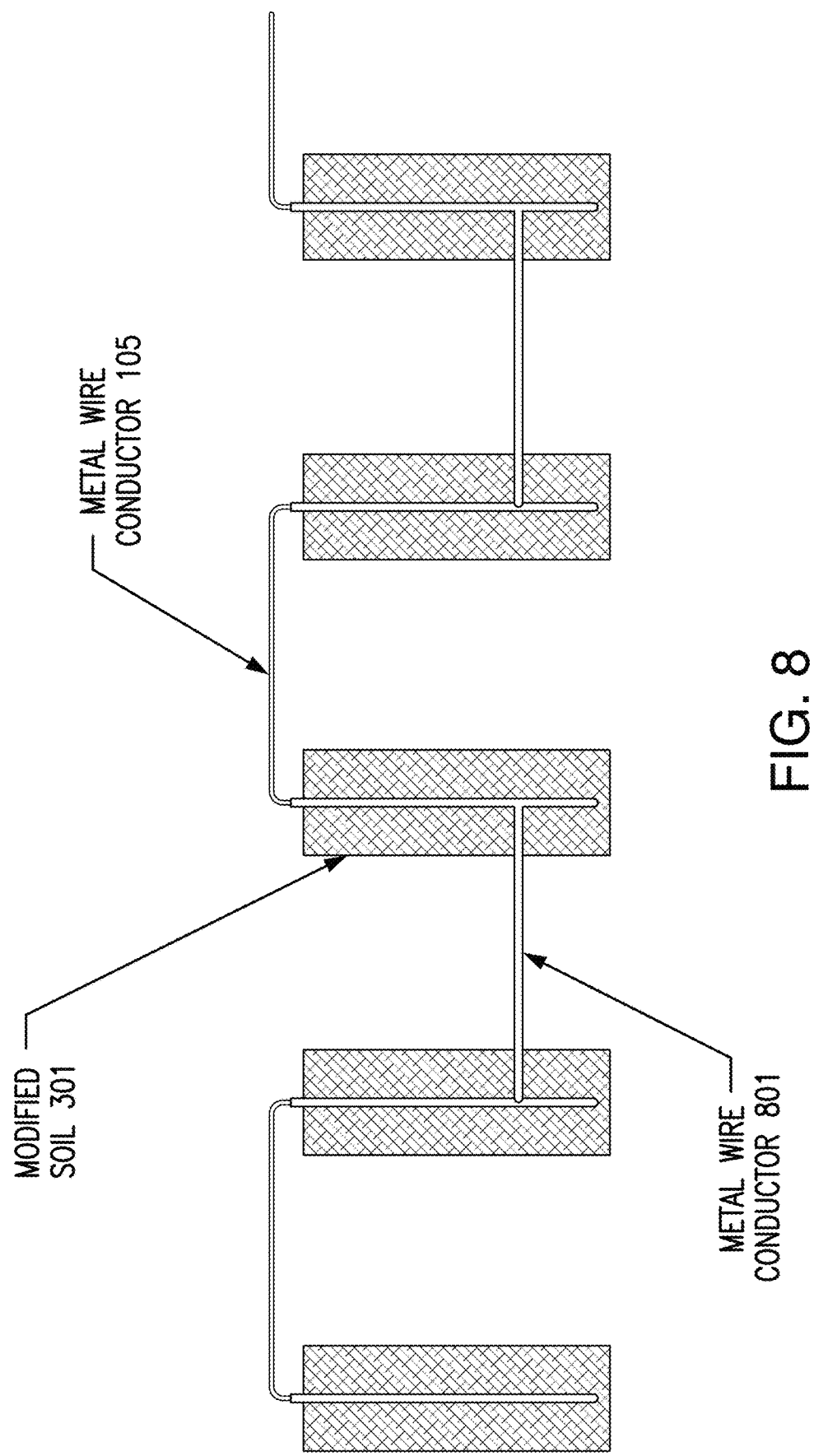
FIG. 8 illustrates a serial array of the electrical protective earthing system of FIG. 3 according to an aspect of the present invention.

FIG. 8 shows the same array of grounding electrode units as FIG. 6 or 7, but electrically wired in series, rather than parallel using a metal wire conductor 801 between some of the array electrodes but connecting them within the earthing mix or beyond the earthing mix (not shown). This arrangement forces reflected energy to pass through multiple grounding electrode units before returning to the fault source, diminishing the amplitude of the reflected energy. In this arrangement, the same option of tailoring each member of the array to respond better to a particular frequency remains an option.

FIGS. 9A-B shows the typical geometry of three grounding electrode units connected via metal cable connection 901 in parallel, demonstrating the need for ample land area required when multiple units are installed in FIG. 9A. FIG. 9B shows a top view of the installation. Note that the spacing is shown as the same as the length of the ground rod 102 used in the installation to meet a common code requirement for simple ground rods.

FIGS. 10A-B shows an alternate geometric arrangement which can be utilized to install multiple grounding electrode units in a way that reduces the land area used while maintaining a separation equal to the length of the ground rod 102 used in the installation. This arrangement requires the grounding electrodes to have sufficient energy dissipation efficiency and illustrates that multiple electrodes can be electrically attached from one fault source connection.

Figure 11:
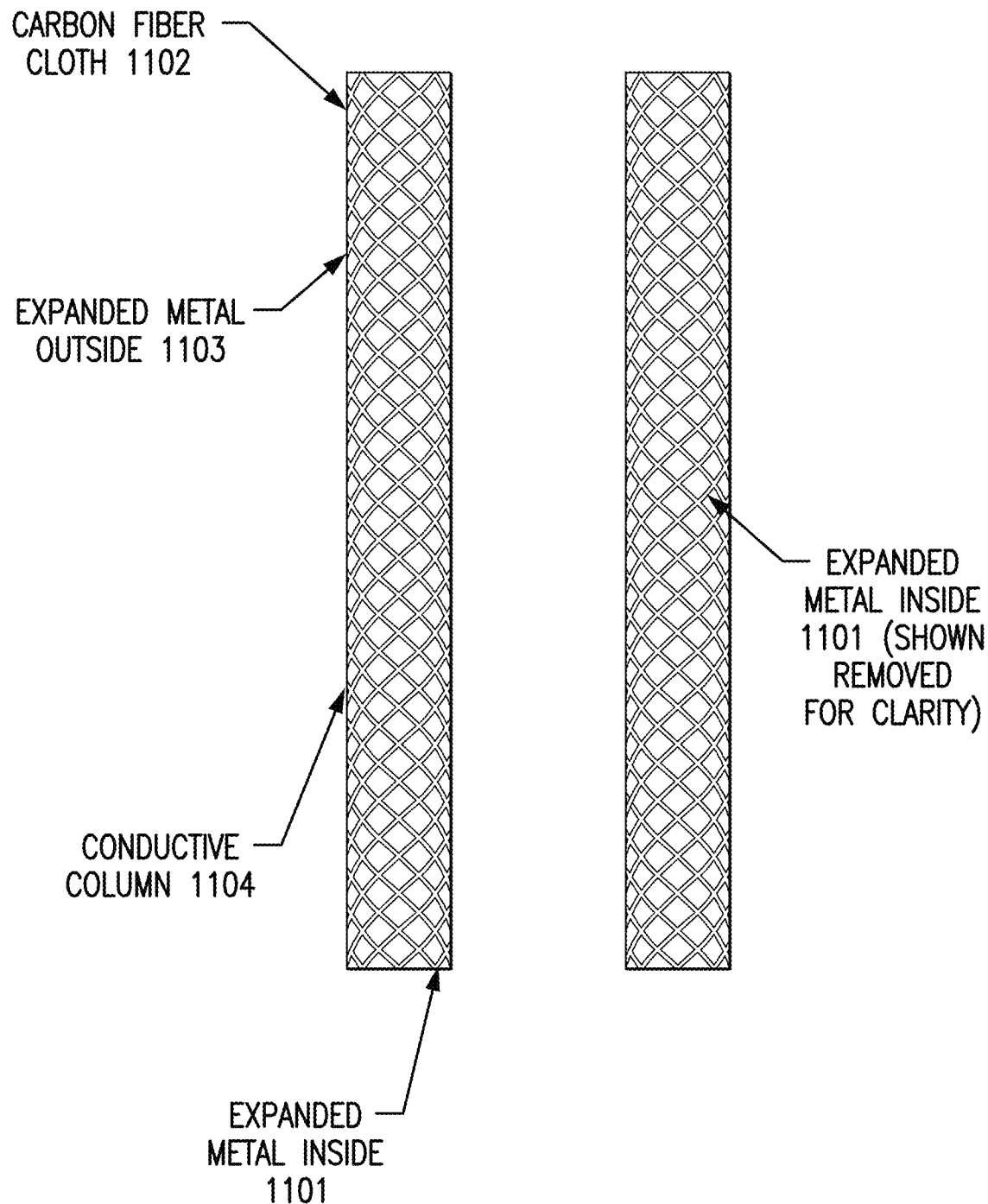
FIGS. 11-12 illustrate an electrode of the system according to an aspect of the present invention.

FIG. 11 shows the basic hollow cylinder construction used in one version of the device described above. The inner layer of the structure is made of expanded metal 1101, which is formed by rolling a flat sheet into a cylinder. Outside that inner shell is a sheet of carbon fiber fabric 1102 wrapped completely around the cylinder. An outer layer of expanded metal 1103 is wrapped tightly over the carbon fiber fabric 1102 such that a laminate or sandwich is formed by the two sheets of expanded metal with the carbon fiber held between them forming a conductive column 1104.

Figure 12:
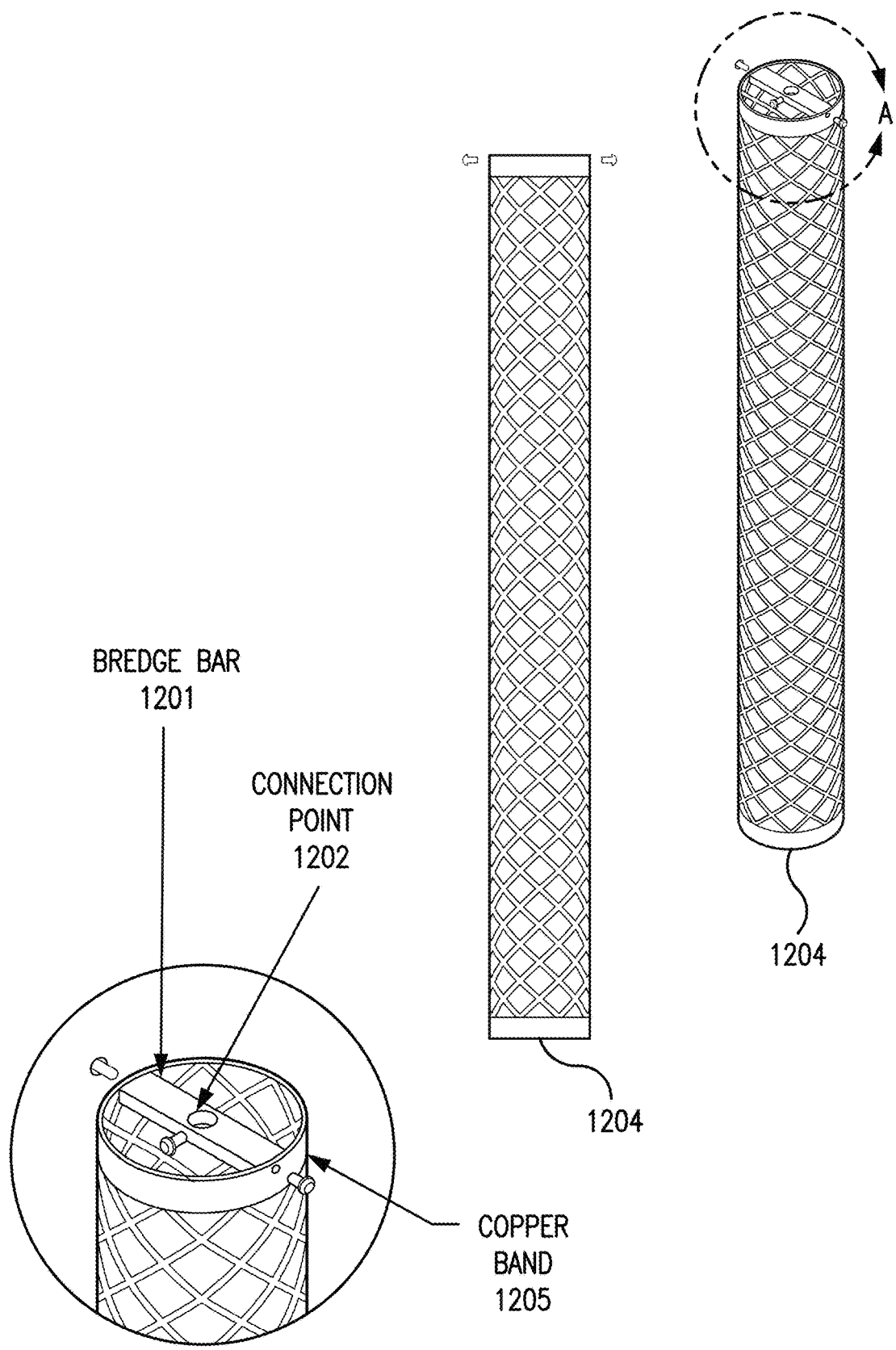

FIG. 12 shows the completed structural unit 1104 from FIG. 11 with a bridge bar 1201 secured in the top end of the cylinder, providing a connection point 1202 to a ground rod or fault current source through a securing bolt hole, and through securing holes on each end and a copper band 1205 around the perimeter of the combined conductive structural unit 1204, securing the communication with all three elements of the conductive column cylinder laminate (expanded metal conductive column 1104, carbon fiber cloth 1102, expanded metal inside 1100.

Figure 13A:
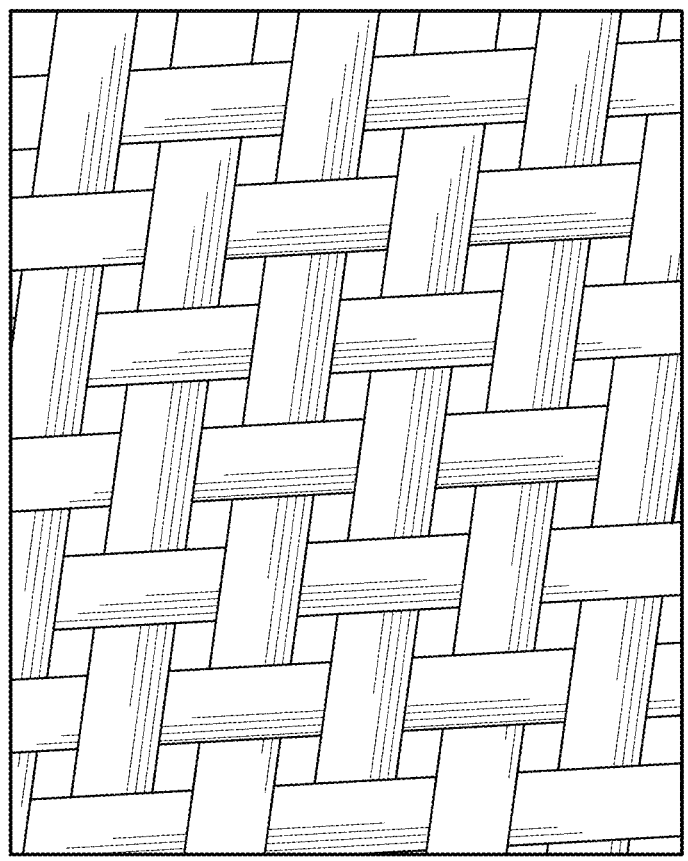
FIGS. 13A-B illustrate a construction of a carbon fiber fabric utilized by an electrode according to an aspect of the present invention.
Figure 13B:
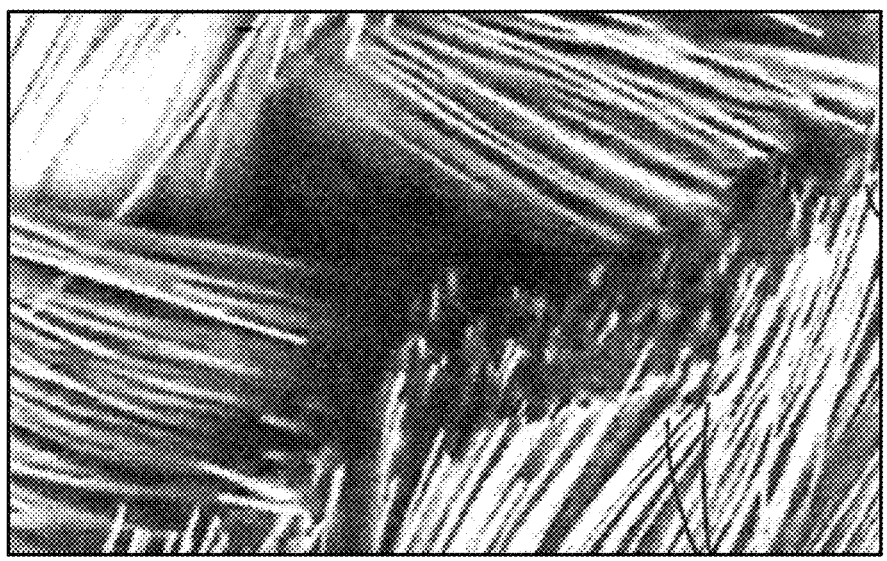

FIGS. 13A-B illustrate the construction of a typical carbon fiber fabric. Typical weave structure is shown in FIG. 13A and the magnified view of the numerous fibers in each strand of the fabric in FIG. 13B.

FIG. 14 shows a series of images from an experiment involving the progressive drying of two earthing mix samples over a period of days as the moisture level fell from about 100% to about 30%. The container shown on the right of each photo contains elongated conductive particles (ECPs).

Figure 15:
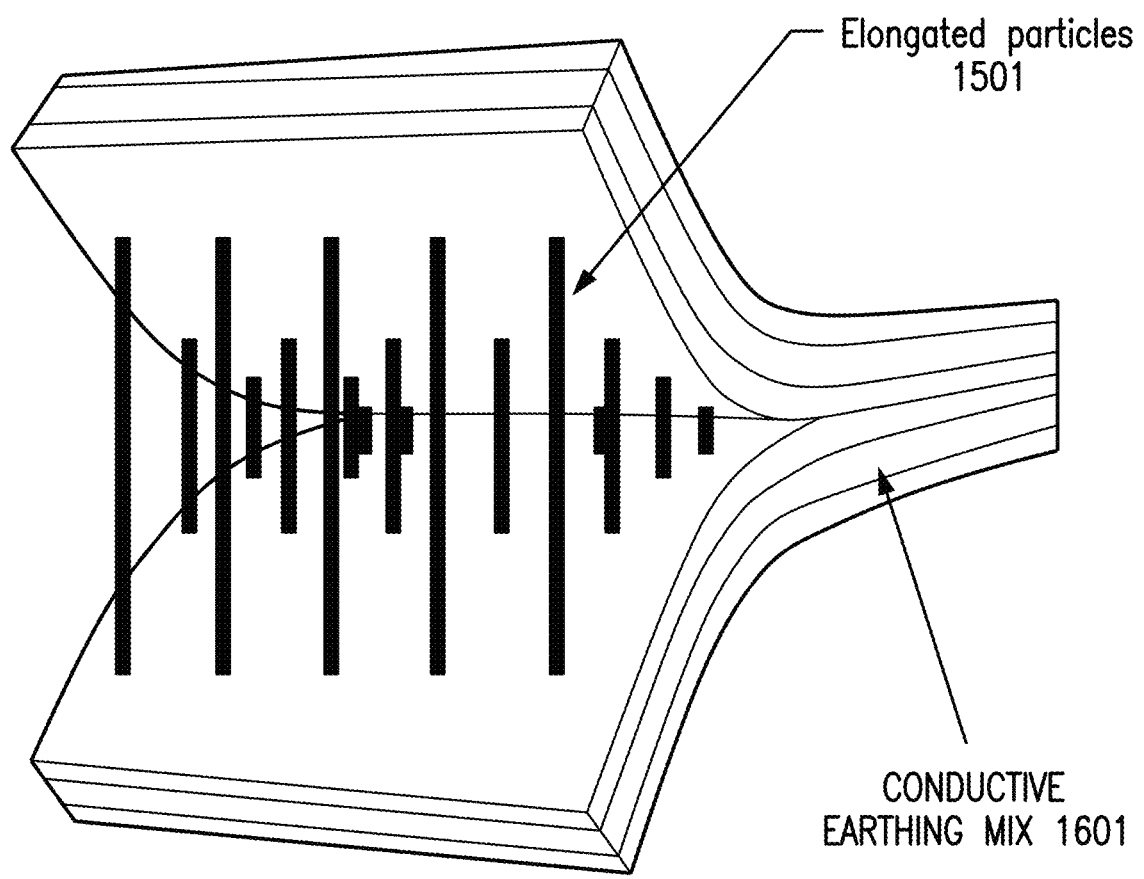
FIG. 15 illustrates the difference in structural stability between dried earthing mix with and without elongated particles.

FIG. 15 shows an earthing mix with elongated particles 1501 acting as structural braces to restrict cracking and subsequent loss of moisture of modified soil 201 or one or more layers of earthing mix 505 or 506.

FIG. 16 shows two grounding electrode installations A, B containing a conductive earthing mix 1601 and an impedance transitioning earthing mix 1602, and local soil 1603 surrounding a metal ground rod 1604 extending down to the ground rod tip 1606. The first grounding electrode A is located above the frost line, and the second grounding electrode B is installed below the frost line to avoid freezing of earthing mixes 1601, 1602, which surround the ground rod tip 1606 of the rod 1604.

Figure 17:
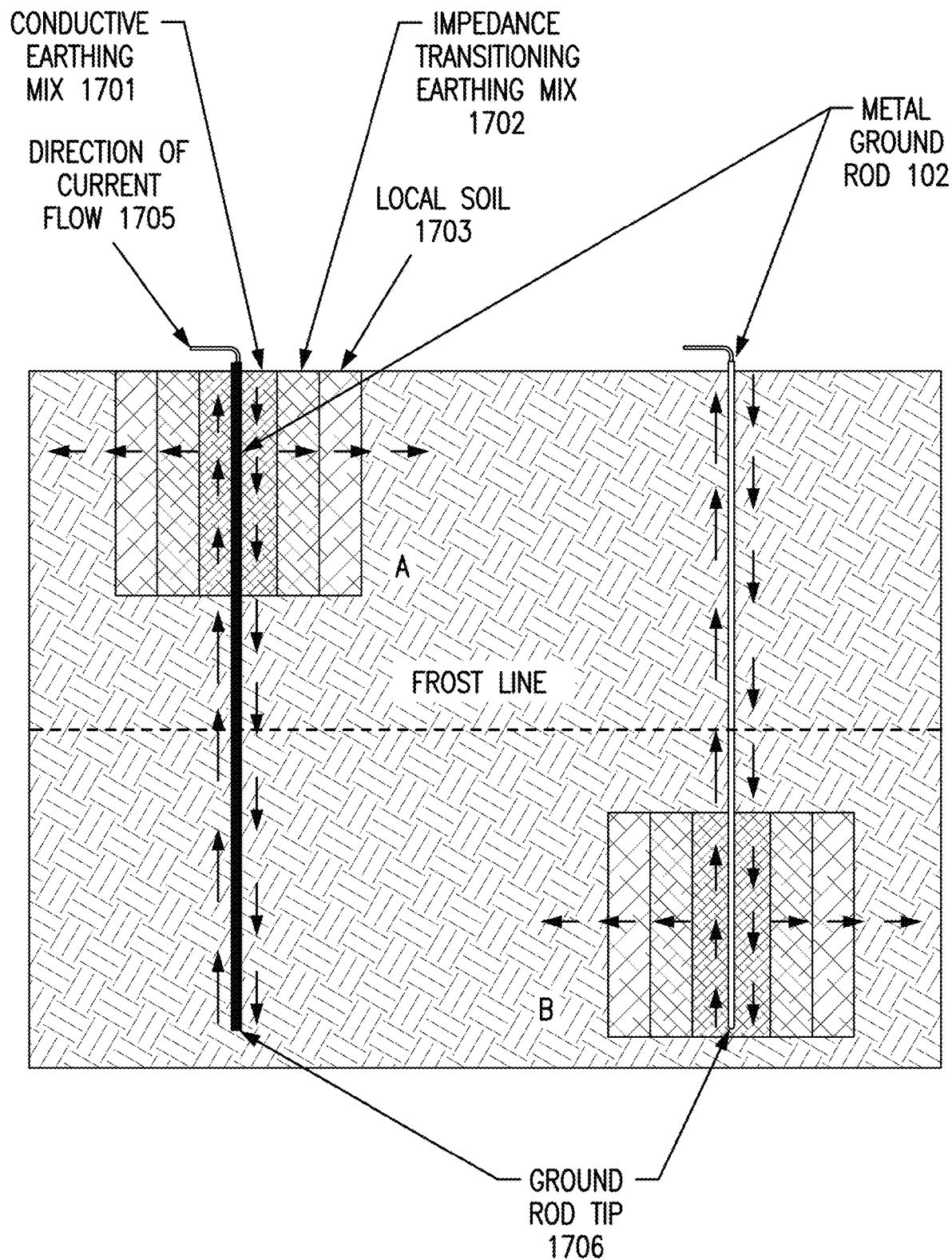
FIG. 17 shows two grounding electrode installations according to an aspect of the present invention.

FIG. 17 shows two grounding electrode installations A, B containing a conductive earthing mix 1701 and an impedance transitioning earthing mix 1702, and backfill 1703 surrounding a metal ground rod 1704 extending down to the ground rod tip 1706. The first grounding electrode A is located above the frost line, and the second grounding electrode B is installed below the frost line to avoid freezing of earthing mixes 1701, 1702, which surround the ground rod tip 1706 of the rod 1704. The path of the current 1705 is shown as well. An electrical earthing system, similar to the one shown in FIG. 3, can be installed with the earthing mixes at any depth as dictated by the installation requirements as shown in FIG. 16. In any case, the flow of electrical energy within the electrical earthing system FIG. 4 can exit through the electrode at any depth as shown in FIG. 17.

As used herein, the term "particles" includes geometry or topography-based subclasses including simple particles which are assumed to be somewhat spherical with or without smooth surfaces, elongated particles in an X-axis, Y-axis, Z-axis sense there is at least one dimension that is at least three (3) times another, and planar particles where there is at least one dimension three times less than both others. Elongated particles have at least two protrusions which will be identified as "ends" or "end points". Planar particles, also referred to as flakes, plates, sheets, and sometimes as lamellar particles, have a thickness in one axis much less than the other dimensions. Any of these particles may be made up of one or more particles acting singly or as an agglomerate.

Conductive Earthing Mix

As discussed above, the conductive earthing mix employs Elongated Conductive Particles (ECPs), ranging from one nanometer (nm) to three centimeters (cm) in length and having an aspect ratio of at least three (also expressed as 3:1). The ECPs can be comprised of conductive materials such as carbon fiber cuttings, nickel-plated polymer fibers, gold, copper-sulfate treated copper, boron fibers, conductive polymer fibers, carbon mesh, chopped metal wires, nickel nanostrands, carbon nanotubes, semiconductors, and blends thereof. In other implementations, other suitable materials can be used. The semiconductors can be selected from the group of carbon nanotubes of any chirality, silicon rods, and Germanium rods. The ECPs enhance the conductivity (reducing the impedance) of the composition containing them, compared to, for instance, the electrolytic fill discussed above with regard to FIG. 5. This enhanced conductivity can be understood to some degree with a weighted mean approach recognizing the use of multiple dimensional scales of conductive ions and particles in the matrix. Especially at higher voltages and concentrations, it can also be understood to some degree as being due to electrical percolation which relies on the tendency for current to jump small gaps between conductive particles when sufficient voltage is available. This also depends upon the electrical properties of the surrounding medium. The use of electrically conductive fibers (ECPs) statistically reduces the number of jumps required to traverse a distance and having end points to accumulate electrical charge, the ECPs will not require as much potential to transfer current from one conductive particle to another as would be needed for comparatively large gaps between conductive particles. In addition, this semi-continuous conductive path reduces the amount of time it takes to distribute the energy volumetrically throughout the conductivity enhanced earthing mix, which allows use of relatively thick grounding structures. During high voltage fault currents including lightning strikes, the resulting large electric field can even alter the dielectric behavior of local soil and clay particles increasing their electrical conductivity nonlinearly.

If the ECPs are constructed of an electromagnetic material, then they provide a further benefit of converting electrical and magnetic energy from a lightning strike into kinetic and potential (or thermal) energy, allowing a more gradual dissipation of energy from the grounding system into the native soil. A problem associated with lightning strikes is the small amount of time over which the energy in the lightning strike acts upon a stricken system, which can exceed the grounding system's capability to dissipate energy. The energy from a lightning bolt results in a large amount of electrical energy entering the grounding system, some of which converts into heat; ground rods installed in fairly pure sand reportedly develop a glass coating after a couple lightning strikes. It is expected that electromagnetic ECPs (EECPs) will extend dissipation time within the grounding system because when lightning energy acts upon an earthing mix containing EECPs, the EECPs will either oscillate or be restricted from oscillating. If the EECPs oscillate, they will convert a portion of the electrical and magnetic energy from the lightning into kinetic energy; if the EECPs are restricted from moving, they will convert a portion of the electrical and magnetic energy from the lightning into potential energy, or heat. In either case, the entirety of the energy of the lightning strike would not immediately get transferred from the ECP-enhanced earthing mix into an ensuing medium, thereby extending dissipation time. The EECPs can be constructed of highly electromagnetic materials, weak electromagnetic materials, naturally occurring electromagnetic materials, or carbon nanotubes and other magnetically susceptible nanomaterials. Highly electromagnetic materials include iron, nickel, and cobalt and alloys containing them. Weak electromagnetic materials include aluminum, uranium, platinum, copper, brass, and lead. Naturally occurring electromagnetic materials include ferrite and hematite.

Additionally, and as discussed in more detail below, it has been found that the ECPs impart a structural benefit to the resulting composition. Specifically, the ECPs have been found to inhibit the shrinking, cracking, and drying of the conductive earthing mix that would otherwise occur over time. The ECPs act as "reinforcing bars" on a miniaturized scale, holding the material together, reducing crack propagation, as shown in FIG. 15, allowing it to retain moisture over a longer period of time, which results in greater conductivity retention. That is, structural reinforcement reduces development of pathways which would allow escape of moisture. As such, the ECPs could be replaced with non-conductive materials including, but not limited to, fiberglass, organic fibers including cotton, sisal, hemp, and kapok, ceramic fibers, ceramic filaments, asbestos, or any other fiber, filament, or particle which would both act as a reinforcing bar and retain its mechanical strength for the life of the product. This fiber, filament, or particle can be coated with a sizing to provide even better mechanical attachment to the surrounding mix and its peers.

Planar Conductive Particles (PCPs), which can have an aspect ratio of more than three, and which can be constructed of the same materials listed above for ECPs, can be used as a substitute for ECPs in the earthing mix. One example of PCPs is copper powder. Others include graphene, especially 3-to-8-layer graphene, reduced graphene oxide (rGO), intercalated rGO, and flaked metals. PCPs can act as a very useful filler in general to increase electrical conductivity of a mix via "rule of mixtures", be it the earthing mix herein discussed or the impedance transitioning earthing composition to be discussed, where percolation can also be very useful to move charges through the mix. This is not quite as efficient as using ECPs, but that inefficiency ends up as heat which is still a legitimate way to dissipate the electrical charges, although heat does not transfer from the grounding system as quickly as would electrical charges. PCPs can be constructed of the same electromagnetic materials listed above for the ECPs and thereby provide benefits similar to those discussed above for ECPs. In addition, PCPs can act as vapor or fluid barrier elements including Bentonite, nanoclays, talc, $MoS_2$, $WS_2$, and other planar materials. Barrier materials are used to reduce or inhibit the rate or amount of intrusion of a material into or out of another material, PCPs and other barrier materials can be used to create an arduous path for any gas, vapor, or other fluid movement thereby reducing loss of moisture, greatly extending the effective life of the mass.

Table 1 below identifies and quantifies the earthing mix prepared according to aspects of the present disclosure, with percentages in all tables herein indicating the amount of each listed material by weight.

TABLE 1

Earthing Mix Composition

| Material Description | Low % | High % |
|---|---|---|
| Moutmorilinite, Bentonite. Illite, Smectite and Attapulgite | 50 | 99 |
| Elongated Conductive Particles (ECPs) | .05 | 8 |
| Metallic Salts of Sulfates and Carbonates hydrated or anhydrous | 1 | 50 |
| Kaolinite-Based Clay Minerals | 0 | 30 |
| Electromagnetic ECPs (EECPs) | 0 | 8 |
| Diatomaceous Earth | 0 | 5 |
| Surfactants | 0 | 2 |
| Organic and inorganic deflocculating agents | 0 | 2 |

The ECPs are further discussed below with regard to the aforementioned structural benefit provided to the earthing mix composition. The remaining components identified in Table 1 will then each be discussed in the order listed.

FIG. 14 comprises a series of perspective views depicting an experiment involving the progressive drying of two earthing mix samples over a period of days, as the moisture level falls from about 100% to about 30%. One sample shown on the right each time, contained ECPs, among other components proportioned within the ranges of Table 1 above, and the other sample shown on the left in FIG. 14, contained the same components in the same proportions except omitting ECPs.

TABLE 2

Effect of ECPs on Resistance of Earthing Mix

Effect of ECPs on Resistance of Conductive Earthing Mix Measured in Ohms

| Moisture Level in Sample | Resistance Bentonite 65% Metal Salts 33% ECPs 0% | Resistance Bentonite 65% Metal Salts 33% ECPs 1% | Percentage Improvement with ECPs |
|---|---|---|---|
| 90% | 193 | 15 | 92.2% |
| 80% | 463 | 6 | 98.7% |
| 70% | 444 | 9 | 98.0% |
| 60% | 492 | 38 | 92.3% |
| 50% | 6300 | 98 | 98.4% |
| | | Average Improvement | 95.9% |

TABLE 3

Effect of Metal Salts on Conductive Earthing Mix

| Age of Mix in Days | Resistance Bentonite 99% Metal Salts 0% ECPs 1% | Resistance Bentonite 96% Metal Salts 3% ECPs 1% | Percent Reduction in Resistance | Resistance Bentonite 75% Metal Salts 24% ECPs 1% | Percent Reduction in Resistance |
|---|---|---|---|---|---|
| 1 | 1730 | 151 | 91.3% | 19 | 98.9% |
| 7 | 1680 | 154 | 90.8% | 82 | 95.1% |
| 14 | 1770 | 193 | 89.1% | 77 | 95.6% |
| 21 | 2550 | 230 | 91.0% | 127 | 95.0% |
| 28 | 4400 | 210 | 95.2% | 82 | 98.1% |
| 35 | 10,600 | 209 | 98.0% | 99 | 99.1% |
| 42 | 5150 | 215 | 95.8% | 41 | 99.2% |
| | | Average | 93.0% | | 97.3% |

The Kaolinite-Based Clay Minerals of the conductivity earthing mix are intended to replace another clay material in the mix (i.e., Montmorilinite, Bentonite, Illite, Smectite, Attapulgite and blends thereof) reducing swelling of the mix, upon addition of water. Kaolinite minerals are not prone to swelling when wetted, but mimic many properties of the bentonite types of clays, including plasticity, viscosity, polarized molecular surfaces, and inert chemistry.

The diatomaceous earth in the earthing mix is designed to dissuade or kill burrowing insects and small animals including ants, bees, termites, cockroaches, beetles, or worms which penetrate the earthing mix that would otherwise harm the wiring or its insulation and/or cause electrical shorts in the electrode from FIG. 5. Another disadvantage of penetration by burrowing insects or small animals is loss of moisture due to the increased pathways for moisture escape. Diatomaceous earth has many sharp edges that can slice the intestines of such undesirable life forms. The amount used can vary within the range recited in Table 1, and its usage is optional, dependent upon the extent of any burrowing insect and small animal problem at the installation site and other poisons can be used as a replacement for diatomaceous earth.

Any surfactants used in the earthing mix are there to keep ECPs including carbon fibers from sticking together. Examples of surfactants that could be used include oleic acid and soap.

The organic and inorganic deflocculating agents used in the consolidation mix change the charge on the particles of the clay (i.e., Montmorilinite, Bentonite, Illite, Smectite, Attapulgite, kaolinite, and blends thereof), such that they repel each other. This breaking apart of a mass of particles is also called de-agglomeration. An example of an inorganic deflocculating agent is an aqueous solution of sodium silicate (water glass).

The earthing mixes can take various forms, including but not limited to a pourable form, a sheet form, an extruded mass, or a pellet form.

Consolidation Mix

The purpose of the consolidation mix/consolidation slurry is to fill voids existing between the deposited pellets in a pelletized form of earthing mix, thereby increasing the final density of electrolytic material. If pellets are deposited in the internal chamber of the conductive structural hollow cylinder, the voids that occur between them will be filled with air, which is a poor conductor of electrical energy. In order to fill these voids, it requires that a consolidation mix be used to transport additional solids to help occupy the void. The consolidation slurry can possess a specific gravity of 1.7 g/cc or less and can contain the following solids and solubles identified in Table 4, below.

TABLE 4

Consolidation Slurry Composition

| Material Description | Low % | High % |
|---|---|---|
| Montmorilinite, Bentonite, Illite, Smectite and Attapulgite | 1 | 40 |
| Conductive Particles | 0 | 2 |
| Metal Salts | 10 | 30 |
| Kaolinite-Based Clay Minerals | 50 | 95 |
| Surfactants | 0 | 2 |
| Organic and inorganic deflocculating agents | 0 | 3 |

The conductive particles used in the consolidation mix/slurry may have the same composition and construction as the ECPs in the earthing mix except for the length of each conductive particle which may be 1 mm or less. Carbon nanotubes are one example of conductive particles acceptable for use in the consolidation slurry.

Impedance Transitioning Earthing Composition

An impedance matching or transitioning earthing composition substitutes for the electrolytic backfill material depicted in FIG. 003. Such a composition would include primarily organic material containing ECPs to transition the fault current exiting the electrode to the higher impedance of surrounding soils, reducing the tendency of an interface between media to reflect energy back to its source. The organic base of the impedance transitioning earthing composition is made from peat, peanut hulls, rice hulls, cellulose or other fibrous organics. The ECPs, comprising about 1% of the mix by weight, are dispersed in an aqueous mixture with the organic material. The ECPs will be less than 1 millimeter in diameter and range from 1 nanometer to 3 centimeters in length, with the ECPs or agglomerations of ECPs dispersed at a random orientation in the mixture. The mixture can be modified with additives to improve water retention properties, such as Montmorilinite, Illite, attapulgite, vermiculite, diatomaceous earth, and gypsum, up to 25% by weight. It can separately or in combination with these, be modified by the addition of metal salts up to 25% by weight. Additionally, the impedance transitioning earthing composition will contain surfactants that improve dispersion of the components, and improve the ability of the mix to rewet from available soil moisture.

The electrical properties of the impedance transitioning earthing composition can be engineered to adapt to surrounding soil conductivity to ensure a smoother transition of the fault current as it exits the electrode FIG. 005 and enters the native soil, which allows improved flow of fault current, mitigating the "bounce-back effect" described above, in other words, minimizing reflection of energy as current passes from one medium into another. As a hypothetical example, a copper electrode might have a resistivity of $1.72 \times 10^{-8}$ ohm-meter and unmodified surrounding soil might have a resistivity of $2 \times 10^4$ ohm-meter. That represents a very significant difference as copper has about 1 trillionth the resistivity of soil and there would be a strong reflection at the copper-soil interface without any transitioning medium. The impedance transitioning earthing composition is configured to provide an intermediate electrical resistance between the core electrode and the local native soil. This reflected energy can be treated like a transmission line reflection where the reflection coefficient, the ratio of the reflected electromagnetic wave's energy divided by the arriving electromagnetic wave's energy, is computed by dividing the difference in the impedance values of two adjacent materials by their sum. In the example above for copper vs. unmodified soil, the reflection coefficient would be almost 1 and most of the energy could be expected to reflect back into the copper. If instead, we can raise the conductivity of the nearest adjacent material to the copper to 80% of copper's value, we can expect a significant reduction in reflected energy to about 11% at that interface and another huge reflectance at the interface of that material and the local soil. Multiple impedance- or resistance-graded layers of impedance transitioning earthing composition ("impedance transitioning earthing mix") can be used to tailor the reflectance of energy; in addition, each layer can absorb reflected energy and multiple layers provide multiple opportunities for energy absorption and reduced energy returns toward the fault source. This is akin to the design of anti-reflection coatings for eyeglasses where multiple dielectric layers are stacked to reduce the reflection of light. This approach to reducing reflections of electromagnetic energy from interfaces or surfaces can be extended to include the use of coatings applied in myriad ways including atomic layer deposition (ALD).

Multiple installations of grounding systems in parallel (see FIGS. 6-7) and in series (FIG. 8), can further reduce amplitudes of reflections. Using engineered adjustments to absorb various frequencies, frequency content of the reflected energy can also be managed.

Combining the above content for impedance matching and broadband properties coverage into one system can result in an efficient transfer of fault current into the soil across a broad set of frequencies. Groups of materials can be chosen to provide desired electrical properties within frequency bands of choice and combined into a blended property earthing system. For example, to carry frequencies from DC to perhaps 200 MHz, copper could be mixed in differing concentrations to provide a wide range of electrical conductivity values for earthing mixes. Note that copper is conductive beyond 200 MHz but its electrical conductivity becomes lower at higher frequencies. To carry frequencies beyond 200 MHz and deep into the GHz frequencies, carbon materials could be paired with copper in the same earthing mixes. Carbon's electrical properties are driven by the arrangement of its atoms. When properly arranged at the nanoscale or as a linear chain, carbon can provide higher electrical conductivity than copper beyond about 200 MHz. The combination of copper and carbon materials can simultaneously provide high electrical conductivity properties to the earthing mix across both frequency regimes resulting in broadband electrical conductivity.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, can be executed out of order from that shown or discussed, including substantially concurrently or in reverse order, depending on the functionality involved, as would be understood by those reasonably skilled in the art of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An earthing system comprising:
   a. an electrode for placement in a hole in the ground;
   b. at least one conductive earthing mix contacting the electrode in the hole in the ground, and
   C. at least one impedance transitioning earthing mix contacting the at least one conductive earthing mix in the hole in the ground;
   wherein the electrode is in communication with a current source and the at least one impedance transitioning earthing mix is not in contact with the electrode.

2. The system of claim 1, wherein the electrode comprises a plurality of electrically conductive materials within different frequency bands.

3. The system of claim 2, wherein the plurality of electrically conductive materials further comprises a first conductive material comprising copper and a second conductive material comprising carbon fiber.

4. The system of claim 3, further comprising a third conductive material comprising nickel or iron.

5. The system of claim 1, wherein the at least one conductive earthing mix or the at least one impedance transitioning earthing mix comprises a clay having moisture retaining properties.

6. The system of claim 1, wherein the at least one conductive earthing mix and the at least one impedance transitioning earthing mix further comprises a plurality of conductive particles.

7. The system of claim 6, wherein the plurality of conductive particles are elongated.

8. The system of claim 6, further comprising non-conductive elongated particles.

9. The system of claim 1, wherein the impedance transitioning earthing mix further comprises an organic base composition.

10. The system of claim 1, further comprising a consolidation mix for replacing air spaces found between the at least one conductive earthing mix, the at least one impedance transitioning earthing mix, and the electrode.

11. The system of system of claim 1, further comprising a top capping mix for placement over the hole, the electrode, the at least one impedance transitioning earthing mix, and the at least one conductive earthing mix to restrict evaporation within the earthing system.

12. The system of claim 1, wherein the at least one impedance transitioning earthing mix further comprises a plurality of impedance transitioning earthing mixes, wherein each of the plurality of impedance transitioning earthing mixes has a unique electrical conductivity level, wherein the plurality of the impedance transitioning earthing mixes are located between the at least one conductive earthing mix in the hole in the ground and native soil of the ground in highest to lowest electrical conductivity levels from the at least one conductive earthing mix to the native soil of the ground.

13. A method of installing an earthing system, comprising:
   a. producing a hole in native soil of the ground;
   b. placing an electrode within the hole;
   c. placing at least one conductive earthing mix adjacent the electrode; and
   d. placing at least one impedance transitioning earthing mix between the at least one conductive earthing mix and the native soil of the ground without the at least one impedance transitioning earthing mix contacting the electrode.

14. The method of claim 13, further comprising
   e. placing a consolidation mix for replacing air spaces found between the at least one conductive earthing mix, the at least one impedance transitioning earthing mix, and the electrode; and
   f. placing a top capping mix for placement over the hole, the electrode, the at least one impedance transitioning earthing mix, the at least one conductive earthing mix, and the consolidation mix to restrict evaporation.

15. The method of claim 14, wherein the at least one conductive earthing mix or the at least one impedance transitioning earthing mix further comprises a plurality of conductive particles and a plurality of elongated particles.

16. The method of claim 13, wherein placing the at least one impedance transitioning earthing mix between the at least one conductive earthing mix and the native soil further comprises:
   i. providing a plurality of impedance transitioning earthing mixes, wherein each of the plurality of impedance transitioning earthing mixes has a unique conductivity level; and
   ii. placing the plurality of the impedance transitioning earthing mixes between the at least one conductive earthing mix in the hole in the ground and native soil of the ground in highest to lowest electrical conductivity levels from the at least one conductive earthing mix to the native soil of the ground.

17. An earthing system comprising:
   a. an electrode for placement in a hole in the ground;
   b. at least one conductive earthing mix contacting the electrode in the hole in the ground, and
   c. at least one impedance transitioning earthing mix contacting the at least one conductive earthing mix in the hole in the ground;
   wherein the at least one impedance transitioning earthing mix further comprises a plurality of impedance transitioning earthing mixes, wherein each of the plurality of impedance transitioning earthing mixes has a unique electrical conductivity level, wherein the plurality of the impedance transitioning earthing mixes are located between the at least one conductive earthing mix in the hole in the ground and native soil of the ground in highest to lowest electrical conductivity levels from the at least one conductive earthing mix to the native soil of the ground.

18. The system of claim 17, wherein the electrode comprises a plurality of electrically conductive materials within different frequency bands.

19. The system of claim 18, wherein the plurality of electrically conductive materials further comprises a first conductive material comprising copper and a second conductive material comprising carbon fiber.

20. The system of claim 17, wherein the at least one conductive earthing mix or the at least one impedance transitioning earthing mix comprises a clay having moisture retaining properties.

21. The system of claim 17, wherein the at least one conductive earthing mix and the at least one impedance transitioning earthing mix further comprises a plurality of conductive particles.

22. The system of claim 21, wherein the plurality of conductive particles are elongated.

* * * * *